United States Patent
Oshima et al.

(10) Patent No.: US 12,264,107 B2
(45) Date of Patent: Apr. 1, 2025

(54) METHOD FOR MANUFACTURING CERAMIC ARTICLE, METAL COMPONENT-CONTAINING LIQUID, KIT FOR MANUFACTURING CERAMIC ARTICLE, AND CERAMIC ARTICLE

(71) Applicant: CANON KABUSHIKI KAISHA, Tokyo (JP)

(72) Inventors: Kanako Oshima, Tokyo (JP); Nobuhiro Yasui, Kanagawa (JP); Yasushi Shimizu, Kanagawa (JP); Yoshinori Kotani, Kanagawa (JP); Shunsuke Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 17/715,465

(22) Filed: Apr. 7, 2022

(65) Prior Publication Data

US 2022/0227670 A1    Jul. 21, 2022

Related U.S. Application Data

(63) Continuation-in-part of application No. PCT/JP2020/039560, filed on Oct. 21, 2020.

(30) Foreign Application Priority Data

Oct. 23, 2019   (JP) ................................ 2019-193068
Oct. 16, 2020   (JP) ................................ 2020-174680

(51) Int. Cl.
*C04B 35/119*       (2006.01)
*B28B 1/00*         (2006.01)
(Continued)

(52) U.S. Cl.
CPC ............ *C04B 35/119* (2013.01); *B28B 1/001* (2013.01); *B33Y 10/00* (2014.12); *B33Y 40/20* (2020.01);
(Continued)

(58) Field of Classification Search
None
See application file for complete search history.

(56) References Cited

U.S. PATENT DOCUMENTS

| | | | |
|---|---|---|---|
| 5,284,695 A | | 2/1994 | Barlow |
| 2001/0027623 A1* | | 10/2001 | Rosenflanz ........... C04B 35/653 51/309 |
| 2012/0237745 A1 | | 9/2012 | Dierkes |

FOREIGN PATENT DOCUMENTS

| | | |
|---|---|---|
| CN | 102574204 A | 7/2012 |
| DE | 19730742 A1 | 1/1999 |

(Continued)

OTHER PUBLICATIONS

Schehl, M., et al., "Alumina nanocomposites from powder-alkoxide mixtures," Acta Materialia, 2002, pp. 1125-1139, vol. 50.

*Primary Examiner* — Elizabeth Collister
(74) *Attorney, Agent, or Firm* — Canon U.S.A., Inc. I.P. Division

(57) ABSTRACT

A method for manufacturing a ceramic article including (i) a step of irradiating a powder mainly containing a ceramic material with an energy beam to sinter or melt and solidify the powder into a solidified portion, wherein the step is repeated a predetermined number of times to sequentially bond the resulting solidified portions together to obtain a ceramic modeling object, (ii) a step of allowing the shaped ceramic object to absorb a metal component-containing liquid that contains inorganic particles containing a metal element; and (iii) a step of heating the shaped ceramic object that has absorbed the metal component-containing liquid.

20 Claims, 6 Drawing Sheets

(51) Int. Cl.
  *B33Y 10/00*    (2015.01)
  *B33Y 40/20*    (2020.01)
  *B33Y 70/00*    (2020.01)
  *C04B 35/14*    (2006.01)
  *C04B 35/626*   (2006.01)
  *C04B 35/628*   (2006.01)
  *C04B 35/64*    (2006.01)

(52) U.S. Cl.
  CPC .............. *B33Y 70/00* (2014.12); *C04B 35/14* (2013.01); *C04B 35/62645* (2013.01); *C04B 35/62886* (2013.01); *C04B 35/64* (2013.01); *C04B 2235/3222* (2013.01); *C04B 2235/3224* (2013.01); *C04B 2235/3244* (2013.01); *C04B 2235/3427* (2013.01); *C04B 2235/5454* (2013.01); *C04B 2235/6026* (2013.01); *C04B 2235/616* (2013.01); *C04B 2235/661* (2013.01); *C04B 2235/665* (2013.01)

(56) References Cited

FOREIGN PATENT DOCUMENTS

| | | |
|---|---|---|
| JP | S62113781 A | 5/1987 |
| JP | 2011143539 A | 7/2011 |
| JP | 2013501701 A | 1/2013 |
| JP | 2016204244 A | 12/2016 |
| JP | 2019019051 A | 2/2019 |
| JP | 2019081358 A | 5/2019 |
| JP | 2020093973 A | 6/2020 |
| JP | 2020147489 A | 9/2020 |
| WO | 2019013334 A1 | 1/2019 |
| WO | 2019208570 A1 | 10/2019 |
| WO | 2020116568 A1 | 6/2020 |

* cited by examiner

METHOD FOR MANUFACTURING CERAMIC ARTICLE, METAL COMPONENT-CONTAINING LIQUID, KIT FOR MANUFACTURING CERAMIC ARTICLE, AND CERAMIC ARTICLE

CROSS-REFERENCE TO RELATED APPLICATIONS

This application is a Continuation of International Patent Application No. PCT/JP2020/039560, filed Oct. 21, 2020, which claims the benefit of Japanese Patent Application No. 2019-193068, filed Oct. 23, 2019 and No. 2020-174680 filed Oct. 16, 2020, which are hereby incorporated by reference herein in their entirety.

TECHNICAL FIELD

The present invention relates to a metal component-containing liquid for absorption into ceramic shaped objects manufactured by additive manufacturing technologies, in particular, by a powder bed fusion process and directed energy deposition process, to a method for manufacturing a ceramic article using the metal component-containing liquid, a kit for manufacturing a ceramic article containing the metal component-containing liquid, and a ceramic article.

BACKGROUND ART

To manufacture a prototype in a short time or to manufacture a small number of parts, additive manufacturing technologies have been widely used, in which a raw material powder is irradiated with an energy beam on the basis of the three-dimensional data of an object to be formed to bond the raw material powders and manufacture the desired object. In shaping using a metal powder as a raw material (metal shaping), a powder bed fusion process has been widely used, and dense and various shaped metal articles have been obtained. The high denseness of the shaped metal article is achieved by effectively melting and solidifying the metal powder. Based on the success in metal shaping, the application of additive manufacturing technologies to ceramic materials has been discussed, and many approaches have been reported.

Unlike metals, common metal oxides, such as aluminum oxide and zirconium oxide, have a low ability to absorb laser beams. To melt metal oxide powders in the same manner as metal powders, it is necessary to input more energy. A laser beam, however, diffuses to cause non-uniform melting; thus, it is difficult to obtain high modeling accuracy.

In addition, because of the low thermal conductivity of metal oxides, a large thermal stress was generated during solidification to form cracks, leading to a decrease in the mechanical strength of the shaped object.

Under such circumstances, Patent Literature 1 states that a thermal stress is relaxed by heating a powder to be melted and the surrounding powder with a preheating laser beam to the extent that the powder is not melted before and after the irradiation with a shaping laser beam. A technique has been disclosed in which the melting temperature is reduced by using a powder of a $Al_2O_3$—$ZrO_2$ eutectic system (eutectic system) composition to reduce the energy required for melting to relax thermal stress, and a phase-separated structure is formed to suppress the extension of cracks. A technique has also been disclosed for improving the mechanical strength of a shaped object by melting a glass powder and infiltrating the molten glass into the shaped object to fill cracks with the glass.

CITATION LIST

Patent Literature

PTL 1: PCT Japanese Translation Patent Publication No. 2013-501701

According to Patent Literature 1, a shaped object having superior mechanical strength is obtained by shaping while preheating. However, light diffused from a portion irradiated with the shaping laser beam may heat and melt a portion of the powder, which has been heated to a high temperature to some extent by the preheating, in the vicinity of the irradiated portion. Thus, a portion not irradiated with the shaping laser beam is shaped, and it is difficult to obtain high modeling accuracy by selectively melting the portion irradiated with the shaping laser beam. In addition, a shaped object formed without preheating and then infiltrated with glass has a low flexural strength of less than 50 MPa even when a powder having an Al2O3-ZrO2 eutectic composition is used.

SUMMARY OF INVENTION

To address such issues, in the manufacture of a ceramic article using an additive manufacturing technology, the present invention provides a method for manufacturing a ceramic article to achieve improved mechanical strength of a shaped object while achieving high modeling accuracy and shape accuracy, a metal component-containing liquid used in the manufacturing method, and a kit for manufacturing a ceramic article.

The present invention also provides a ceramic article that can have a freely-designed shape, which is an advantage of applying an additive manufacturing technology, and that has superior modeling accuracy, shape accuracy, and mechanical strength.

A first aspect of the present invention is directed to providing a method for manufacturing a ceramic article, the method including: (i) a step of irradiating a powder containing a ceramic material as a main component with an energy beam to sinter or melt and solidify the powder, thereby forming a solidified portion to provide a shaped ceramic object; (ii) a step of allowing the shaped ceramic object to absorb a metal component-containing liquid that contains inorganic particles containing a metal element; and (iii) a step of heat-treating the shaped ceramic object that has absorbed the metal component-containing liquid.

A second aspect of the present invention is directed to providing a metal component-containing liquid for repairing a crack in a shaped ceramic object formed by an additive manufacturing method using an energy beam, the metal component-containing liquid containing a solvent and inorganic particles, the inorganic particles containing a metal element and having an average particle size of 300 nm or less, in which an oxide of the metal element is capable of forming a eutectic with at least one compound contained in the shaped ceramic object.

A third aspect of the present invention is directed to providing a ceramic article-manufacturing kit for manufacturing a ceramic article by an additive manufacturing method using an energy beam, the ceramic article-manufacturing kit including a powder containing a ceramic material as a main component, and a metal component-containing liquid, in which the metal component-containing liquid contains a solvent and inorganic particles containing a metal element, and an oxide of the metal element is capable of forming a eutectic with a compound contained in a shaped ceramic object formed from the powder.

A fourth aspect of the present invention is directed to providing a ceramic article manufactured by an additive manufacturing technology, the ceramic article including three types of phases containing at least one metal element in common, in which at least two of the three types of phases are phases of composite compounds.

Further features of the present invention will become apparent from the following description of exemplary embodiments with reference to the attached drawings.

DESCRIPTION OF EMBODIMENTS

Figure 1A:
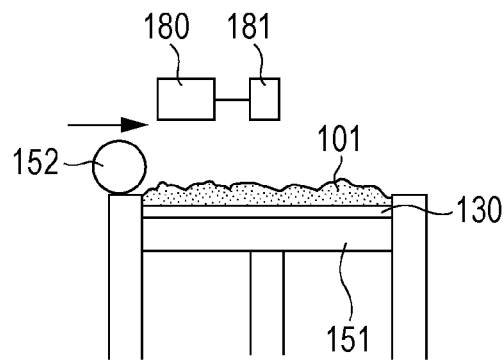
FIG. 1A schematically illustrates a process of manufacturing a ceramic article using a powder bed fusion process.

While embodiments of the present invention will be described below with reference to the drawings, the present invention is not limited to the following specific examples.

A method for manufacturing a ceramic article according to the present invention can provide a ceramic article having superior modeling accuracy, shape accuracy, and mechanical strength by subjecting a ceramic object shaped by an additive manufacturing method to appropriate treatment using a metal component-containing liquid. Specifically, the metal component-containing liquid is absorbed into cracks in the shaped ceramic object obtained by the additive manufacturing method, and then heat treatment is performed to locally melt only regions near cracked portions, thereby reducing or eliminating the cracks.

The additive manufacturing technology is a process of forming an object by bonding materials based on the three-dimensional shape data of a modeling model to be formed. In many cases, a method of bonding materials in layers is employed. The use of the additive manufacturing technology enables the manufacture of a ceramic article with a complex shape or fine shape, which is difficult to manufacture by a conventional method, such as a molding method or a removal processing, e.g., cutting. The method of manufacturing a ceramic article according to the present invention includes the additive manufacturing technology using a powder bed fusion process or a directed energy deposition process (so-called cladding process). The metal component-containing liquid of present invention is suitably used for a shaped object formed by the additive manufacturing using the powder bed fusion process or directed energy deposition process.

A method for manufacturing a ceramic article, the method including a treatment step using a metal component-containing liquid, will be described, and then a ceramic article manufactured by the above manufacturing method and a kit for manufacturing a ceramic article will be described.

Method for Manufacturing Ceramic Article

A method for manufacturing a ceramic article of the present invention will be described. The manufacturing method of the present invention is characterized by the following three steps.

(i) A powder containing a ceramic material as a main component is irradiated with an energy beam to sinter or melt and solidify the powder to provide a shaped ceramic object.

(ii) The shaped ceramic object is allowed to absorb a metal component-containing liquid that contains inorganic particles containing a metal element as a component.

(iii) The shaped ceramic object that has absorbed the metal component-containing liquid is heat-treated.

Hereinafter, each step will be specifically described by taking, as an example, a case where shaping is performed using a powder containing, as a main component, aluminum oxide, which is a general-purpose structural ceramic material. However, the technical idea is not limited to the powder containing aluminum oxide as the main component. This method can also be used for shaping using a powder containing silicon oxide as the main component or containing another ceramic material as the main component. This method can also be used for shaping using a powder mixture of multiple ceramic materials (such as aluminum oxide, silicon oxide, and magnesium oxide) to form a shaped object of a desired ceramic material (such as mullite or cordierite).

In the present invention, a powder containing a ceramic material, as a main component, for shaping a ceramic object may be composed of an inorganic compound powder. A powder composed of an amorphous or single-crystal material may also be used, as well as a ceramic material defined as sintered polycrystalline material.

In the present invention, a component that is contained in the largest mole ratio in an object (powder, shaped object, or article) for which components are discussed is referred to as a "main component". The expression "principal component"

is also used synonymously with the "main component". An accessory component refers to a component other than the main component. The accessory component, such as a sintering aid or an infrared absorber, is added to facilitate shaping.

Step (i)

This is a step of irradiating a powder containing a ceramic material as a main component with an energy beam to sinter or melt and solidify the powder, thereby forming a solidified portion to provide a shaped ceramic object.

Figure 1B:
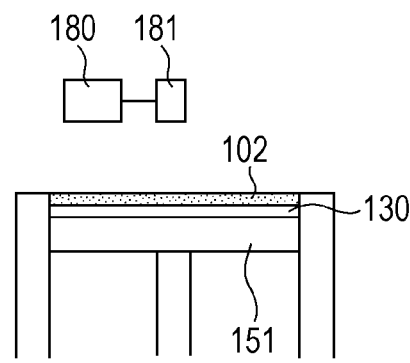
FIG. 1B schematically illustrates the process of manufacturing a ceramic article using the powder bed fusion process.
Figure 1C:
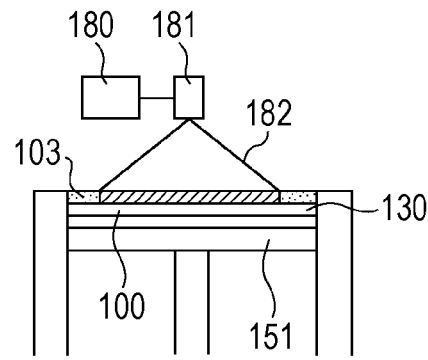
FIG. 1C schematically illustrates the process of manufacturing a ceramic article using the powder bed fusion process.
Figure 1D:
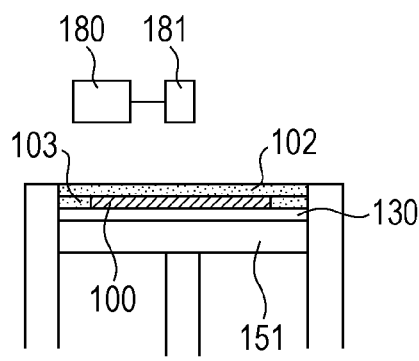
FIG. 1D schematically illustrates the process of manufacturing a ceramic article using the powder bed fusion process.
Figure 1E:
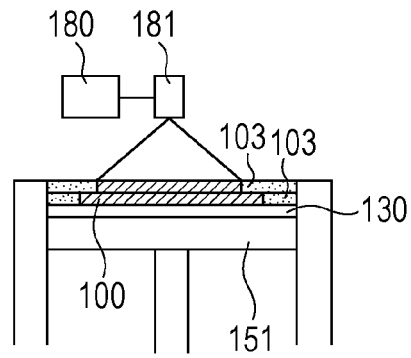
FIG. 1E schematically illustrates the process of manufacturing a ceramic article using the powder bed fusion process.
Figure 1F:
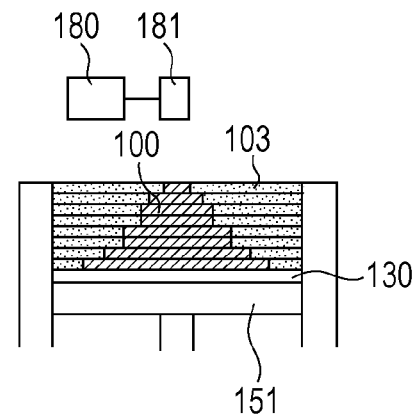
FIG. 1F schematically illustrates the process of manufacturing a ceramic article using the powder bed fusion process.
Figure 1G:
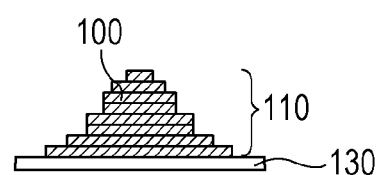
FIG. 1G schematically illustrates the process of manufacturing a ceramic article using the powder bed fusion process.
Figure 1H:
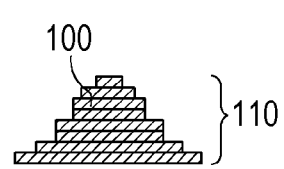
FIG. 1H schematically illustrates the process of manufacturing a ceramic article using the powder bed fusion process.

A basic shaping procedure using a powder bed fusion process is illustrated with reference to FIGS. 1A to 1H. A powder 101 containing a ceramic material as a main component is placed on a base 130 provided on a stage 151, and a powder layer 102 is formed with a roller 152 (FIGS. 1A and 1B). A surface of the powder layer 102 is irradiated with an energy beam emitted from an energy beam source 180 while the energy beam is scanned by a scanner member 181 in accordance with the three-dimensional shape data of the article to be manufactured. In an irradiation area 182 of the energy beam, the powder is sintered or melted and solidified to form a solidified portion 100 (FIG. 1C). The stage 151 is lowered, and a powder layer 102 is newly formed on the solidified portion 100 (FIG. 1 D). The newly formed powder layer 102 is irradiated with an energy beam in the same manner as in FIG. 1C to form a solidified portion 100 in the irradiation area. At this time, when the power of the energy beam is adjusted to the extent that the surface layer of the previously formed solidified portion adjacent to the newly formed powder layer 102 melts, the previously formed solidified portion and the solidified portion to be formed later can be bonded to each other. Repeating the series of operations forms a shaped object 110, having a desired shape, in which the solidified portions 100 formed in the respective layers (FIGS. 1E and 1F). An unsolidified powder 103 is removed, and if necessary, the removal of an unnecessary portion of the shaped object and the separation of the shaped object from the base are performed (FIG. 1G and FIG. 1H).

Figure 2A:
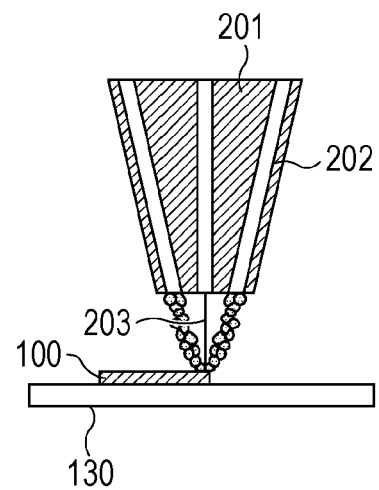
FIG. 2A schematically illustrates a process of manufacturing a ceramic article using a directed energy deposition process.
Figure 2B:
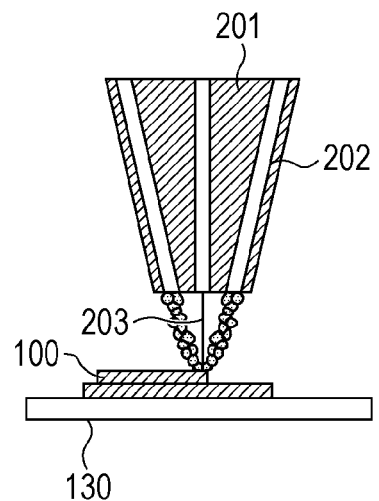
FIG. 2B schematically illustrates the process of manufacturing a ceramic article using the directed energy deposition process.
Figure 2C:
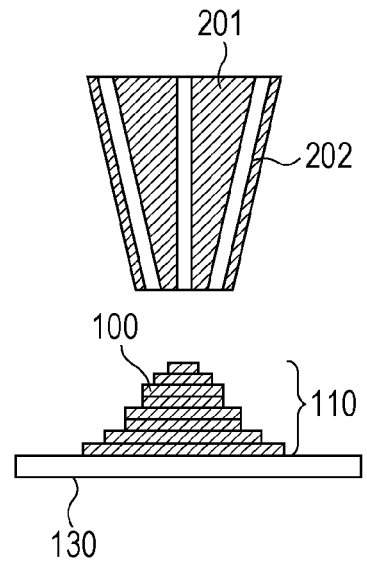
FIG. 2C schematically illustrates the process of manufacturing a ceramic article using the directed energy deposition process.

A basic shaping procedure using a cladding process is illustrated with reference to FIGS. 2A to 2C. In the cladding process, a powder is ejected from multiple powder feed holes 202 in a cladding nozzle 201, and a region on which the powder is focused is irradiated with an energy beam 203 to form an additional solidified portion 100 at a desired location (FIG. 2A). As with the powder bed fusion process, when the power of the energy beam 203 is adjusted to the extent that the surface layer of the underlying portion melts, the foregoing operation can be repeated to form a shaped object 110, having a desired shape, in which the solidified portions are unified (FIGS. 2B and 2C). If necessary, the removal of an unnecessary portion of the shaped object and the separation of the shaped object from the base are performed.

In each process, when a powder is irradiated with an energy beam, the powder absorbs the energy, and the energy is converted into heat to melt the powder. In a region where the energy beam has passed and the irradiation has completed, the melted portion is cooled by a surrounding atmosphere and an adjacent portion and sintered or solidified to form a solidified portion. At this time, the rapid cooling of the molten portion during the solidification process generates stress in the surface layer and the inside of the shaped object, resulting in the formation of numerous cracks.

As the energy beam to be used, a source of light with an appropriate wavelength is selected in view of the absorption characteristics of the powder. For high-accuracy shaping, a laser beam or electron beam with a small beam diameter and high directivity is preferably used. Examples of a suitable energy beam include YAG lasers and fiber lasers in the 1-μm wavelength band and $CO_2$ lasers in the 10-μm wavelength band, in view of versatility.

Powder Containing Ceramic Material as Main Component

Here, a powder containing aluminum oxide ($Al_2O_3$), which is a general structural ceramic material, as a main component (hereinafter, also referred to as a "raw material powder") will be described in detail as an example. The powder containing aluminum oxide as a main component preferably contains an oxide of a rare-earth element, as an accessory component, that forms a eutectic composition with aluminum oxide. Specifically, the powder particularly preferably contains at least one selected from gadolinium oxide ($Gd_2O_3$), yttrium oxide ($Y_2O_3$), terbium oxide ($Tb_2O_3$), and praseodymium oxide ($Pr_2O_3$). When the raw material powder contains aluminum oxide and gadolinium oxide that form eutectic compositions, for example, in the case of a $Al_2O_3$—$Gd_2O_3$ system, there are three eutectic compositions. The eutectic points at or near the three eutectic compositions are each lower than the melting point of aluminum oxide alone and the melting point of gadolinium oxide alone. This enables the melting of the powder with a small amount of heat and suppresses the diffusion of energy within the powder, thus improving the modeling accuracy. In addition, when the raw material powder contains gadolinium oxide, the shaped object has a phase-separated structure having two or more phases. This suppresses crack growth to improve the mechanical strength of the shaped object. When an oxide of another rare-earth element, such as yttrium oxide, is contained, the same effect as in the case of gadolinium oxide can be obtained.

When the energy beam is a laser beam, the powder sufficiently absorbs energy. This suppresses the spread of heat within the powder and localizes heat to reduce the effect of heat on a non-shaped portion, thus improving the modeling accuracy. For example, when a Nd:YAG laser or fiber laser in the 1-μm wavelength band is used, the powder more preferably contains a component that exhibits good energy absorption as an accessory component, such as terbium oxide ($Tb_4O_7$), praseodymium oxide ($Pr_6O_{11}$), $Ti_2O_3$, TiO, SiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, CuO, $Cr_2O_3$, $CrO_3$, NiO, $V_2O_3$, $VO_2$, $V_2O_5$, $V_2O_4$, $Co_3O_4$, CoO, a transition metal carbide, a transition metal nitride, $Si_3N_4$, AlN, a borides, or a silicide. The raw material powder preferably contains another rare-earth element compound that exhibits low energy absorption to the laser beam, in addition to a rare-earth element compound that exhibits good energy absorption to the laser beam, such as terbium oxide ($Tb_4O_7$) and praseodymium oxide ($Pr_6O_{11}$). The absorber is a component (an element or a compound) with a higher ability to absorb light having a wavelength contained in the laser used for shaping than the main component. With regard to the absorption ability of the absorber, the absorber preferably has an absorptance of 10% or more, more preferably 40% or more, even more preferably 60% or more, with respect to light having a wavelength contained in the laser beam to be used.

In view of the above, examples of a particularly suitable raw material powder include $Al_2O_3$—$Gd_2O_3$, $Al_2O_3$—$GdAlO_3$, $Al_2O_3$—$Tb_4O_7$, $Al_2O_3$—$Gd_2O_3$—$Tb_4O_7$, $Al_2O_3$—$GdAlO_3$—$Tb_4O_7$, $Al_2O_3$—$Pr_6O_{11}$, $Al_2O_3$—$Gd_2O_3$—$Pr_6O_{11}$, $Al_2O_3$—$GdAlO_3$—$Pr_6O_{11}$, $Al_2O_3$—$Y_2O_3$, $Al_2O_3$—$YAlO_3$, $Al_2O_3$—$Y_3Al_5O_{12}$, $Al_2O_3$—$Y_2O_3$—$Tb_4O_7$, $Al_2O_3$—$YAlO_3$—$Tb_4O_7$, $Al_2O_3$—$Y_3Al_5O_{12}$—$Tb_4O_7$, $Al_2O_3$—$Y_2O_3$—$Pr_6O_{11}$, $Al_2O_3$—$YAlO_3$—$Pr_6O_{11}$, $Al_2O_3$—$Y_3Al_5O_{12}$—$Pr_6O_{11}$, $Al_2O_3$—$ZrO_2$, $Al_2O_3$—$ZrO_2$—$Tb_4O_7$, $Al_2O_3$—$ZrO_2$—$Pr_6O_{11}$, $Al_2O_3$—$SiO$, $Al_2O_3$—$Gd_2O_3$—$SiO$, $Al_2O_3$—$GdAlO_3$—$SiO$, $Al_2O_3$—$Y_2O_3$—$SiO$, $Al_2O_3$—$YAlO_3$—$SiO$, $Al_2O_3$—$Y_3Al_5O_{12}$—$SiO$, $Al_2O_3$—$ZrO_2$—$SiO$, $SiO_2$—$Tb_4O_7$, $SiO_2$—$Pr_6O_{11}$, ($MgO$—$Al_2O_3$—$SiO_2$)—$Tb_4O_7$, ($MgO$—$Al_2O_3$—$SiO_2$)—$Pr_6O_{11}$, ($Al_2O_3$—$SiO_2$)—$Tb_4O_7$, and ($Al_2O_3$—$SiO_2$)—$Pr_6O_{11}$.

The powder containing a ceramic material as a main component preferably contains a composition capable of forming a eutectic in a ratio that forms a eutectic composition. The eutectic composition is a composition at a eutectic point indicated in a phase diagram. In the shaping process using an energy beam, the heating and cooling states occur very rapidly. Thus, even if the composition deviates from the eutectic point, a eutectic structure having a phase-separated structure is formed. Thus, the eutectic composition in the manufacturing method of the present invention is preferably defined as a composition range in which a eutectic structure is formed, and includes a range of ±10% by mole with respect to the eutectic composition in the phase diagram. Similarly, in the case of a powder containing a main component other than aluminum oxide, a composition that forms a eutectic is preferably contained at a ratio that forms a eutectic composition.

The fact that component X and another component Y can form a eutectic may be expressed as "component X and component Y are in a eutectic relationship". The eutectic is a mixture of two or more types of crystals simultaneously crystallized from a liquid containing two or more components. The phrase "component X and component Y can form a eutectic" is synonymous with the phrase "component X and component Y have a eutectic state". In the case of a eutectic state, a eutectic point (also referred to as a "eutectic temperature") exists. A eutectic point is a temperature at which a eutectic forms, and corresponds to a minimum value of a liquid phase curve in a phase diagram in which the vertical axis represents a temperature and the horizontal axis represents a component composition ratio. A composition corresponding to a eutectic point is referred to as a eutectic composition. Accordingly, the eutectic point of component X and component Y is lower than the melting point of each of component X and component Y.

In this specification, materials are described using chemical formulae, such as $Al_2O_3$ and $Tb_4O_7$ described above, in some cases. The actual composition ratio of the elements of a material need not be exactly the same as the ratio in the chemical formula as long as the gist of the present invention is satisfied. That is, the valence of a metal element contained in a certain material may be slightly different from the valence assumed from the chemical formula. For example, in the case of SiO, when the constituent element ratio of the absorber is Si:O=1:1.30, it is also included in the present invention because it exhibits good energy absorption for the laser beam. From the viewpoint of obtaining a sufficient light-absorbing ability, a more preferable elemental composition ratio is such that the deviation from the stoichiometric ratio is within ±15%.

Step (ii)

In the step (ii), the shaped ceramic object obtained in the step (i) is allowed to absorb a metal component-containing liquid that contains inorganic particles containing a metal element. In the case of direct shaping process, such as a powder bed fusion process or a cladding process, a portion of a powder melted by irradiation with an energy beam is cooled by the surroundings and solidifies to form a solidified portion. In the case of a ceramic material, many cracks are formed in the solidified portion. This is presumably due to thermal stress caused by the temperature difference between a non-solidified portion and the solidified portion because of the small thermal conductivity of the material itself. Such solidified portions are bonded to each other to form a shaped object. As a result, the cracks are distributed in a grid-like pattern over the entire object, substantially depending on the scanning direction of the energy beam. When a cross-section of the shaped object is observed with, for example, a scanning electron microscope, most of the cracks have a width of several nanometers to several micrometers. The length of the cracks varies from several micrometers to several millimeters. These cracks seem to be the main cause of the low mechanical strength of the shaped object.

When the metal component-containing liquid is brought into contact with a shaped object having cracks as described above, the metal component-containing liquid is absorbed into the cracks of the shaped object, and the inorganic particles containing the metal element are distributed. The shaped object that has absorbed the metal component-containing liquid can be heated within a predetermined temperature range in the step (iii) described below to selectively melt only regions near the cracks. This process can reduce the cracks present in the shaped object to improve the mechanical strength of the shaped object while suppressing the shape change of the object.

Metal Component-Containing Liquid

The metal component-containing liquid will be described.

The metal component-containing liquid used in the step (ii) contains the inorganic particles containing at least the metal element and a solvent. In the step of absorbing the metal component-containing liquid into the shaped object, it is not necessary to densely fill the cracks of the shaped object with the inorganic particles. It is sufficient to allow the inorganic particles to be present almost uniformly on surfaces of portions of the shaped object facing the cracks. To distribute the inorganic particles throughout the cracks, the metal component-containing liquid preferably contains inorganic particles having a particle size sufficiently less than the width of each crack. In the case of direct shaping processes, such as a powder bed fusion process and a cladding process, most of the cracks have a width of several nanometers to several micrometers. Among these, in order to reduce cracks having a size contributing to the mechanical strength (three-point flexural strength), the inorganic particles preferably have an average particle size of 300 nm or less. To further reduce cracks and improve the mechanical strength, the average particle size is preferably 100 nm or less, more preferably 50 nm or less. The particle size is defined as the equivalent spherical diameter, which is the diameter of a sphere having the same physical properties. A method for measuring the average particle size is not limited to a particular method. For example, a dynamic light scattering method and a microscopic method can be employed. The average particle size in the present invention is the median diameter, which is the particle size where the cumulative frequency is 50% ($D_{50}$).

The shape of the fine particles is not limited to a particular shape. Examples thereof include spherical shapes, columnar shapes, ellipsoidal shapes, cubic shapes, rectangular parallelepiped shapes, needle-like shapes, plate-like shapes, scale-like shapes, and pyramidal shapes.

The metal element contained in the inorganic particles is preferably a metal element whose oxide can form a eutectic with at least one compound contained in the shaped ceramic object. As described above, the eutectic point at which the eutectic of the oxide of the metal element contained in the inorganic particles and the component of the shaped ceramic object is formed is lower than the melting point of each single component. This enhances the effect of reducing the melting point of regions near the cracks in the shaped object where the inorganic particles are present.

After the metal component-containing liquid is absorbed by the shaped object and the inorganic particles in the metal component-containing liquid are distributed in the cracks in the shaped object, the shaped object is heated in the step (iii) described below. The presence of the inorganic particles and the component of the shaped ceramic object locally reduces the melting point, and thus portions of the shaped object near the cracks can be selectively melted. This facilitates the reduction of cracks in the shaped object while maintaining the shape of the shaped object.

Examples of the inorganic particles containing the metal element include metal particles, metal oxide particles, metal nitride particles, metal carbide particles, metal boride particles, and metal hydroxide particles. Any bonding state of atoms constituting the inorganic particles may be used. They may be crystalline or amorphous.

In particular, the main component of the inorganic particles is preferably a metal oxide. When the main component of the inorganic particles is a metal oxide, volatile components, such as carbon dioxide and water vapor, are less likely to be generated during the heat treatment process in the step (iii), thus enabling stable heat treatment. The shaped ceramic object formed in the step (i) may be in a state in which oxygen is less than the stoichiometric ratio due to an extreme reaction caused by the energy beam. In this case, the heat treatment in the step (iii) is preferably performed in an atmosphere containing oxygen, thereby enabling the promotion of oxidation of the shaped object and the elimination of oxygen deficiency. The metal oxide particles are less likely to undergo an oxidation reaction during the heat treatment and do not interfere with the oxygen supply to the shaped object itself, compared with metal particles and the like, From these viewpoints, the inorganic particles containing a metal oxide as a main component are preferable.

The heat treatment may generate a toxic gas. Thus, the halogen element concentration in the inorganic particles is preferably 1,000 ppm or less, which is an impurity level.

Letting the compound contained in the shaped ceramic object that absorbs the metal component-containing liquid be "component X", and letting the oxide of the metal element contained in the inorganic particles contained in the metal component-containing liquid be "component Y", component X and component Y are preferably in a relationship in which a eutectic state is formed. In this case, the local melting that occurs in the cracks is presumed to be due to the following phenomenon. Any component X may be used as long as component X and component Y are in a relationship in which a eutectic state is formed. The composite of multiple components (for example, a phase-separated structure) may be collectively regarded as component X. For example, as will be described in detail below, a shaped object formed from an $Al_2O_3$—$Gd_2O_3$-based raw material powder has a phase-separated structure of two components of $Al_2O_3$ and $GdAlO_3$. In this case, component X may refer to the phase-separated structure of the two components of $Al_2O_3$ and $GdAlO_3$. $Al_2O_3$, $GdAlO_3$, and zirconium oxide are in a relationship in which a eutectic state is formed; thus, zirconium oxide can be used as component Y.

When the shaped object absorbs the metal component-containing liquid, a certain amount of the inorganic particles contained in the metal component-containing liquid is present not only on the surface of the shaped object but also on faces constituting the cracks in the shaped object. When the heat treatment is performed in this state, the main component of the inorganic particles is a metal oxide, or the metal element included in the inorganic particles is oxidized into a metal oxide in the step of the heat treatment; thus, a certain amount of component Y is present on the faces constituting the cracks in the shaped object. In regions near component Y present on the surface, component X in an amount such that component X has a composition ratio at or near a eutectic composition with the amount of component Y melts at a temperature lower than the melting point of the shaped object. Then, when the fused composition further fuses with component X contained in the surrounding portion of the shaped object, the proportion of component X in the resulting fused composition increases to relatively increase the melting point thereof, thus resulting in recrystallization to contribute to the repair of cracks. Accordingly, only the regions near the cracks are softened and recrystallized while maintaining the shape of the shaped object, thereby seemingly providing the effect of reducing or eliminating the cracks. This process has the advantage of being easy to control because the progress is completed only by maintaining the heating temperature at a constant level.

For this reason, it is considered that in the portions where the cracks are repaired, the bonding between the structures is strong, compared with a method of filling the cracks by glass infiltration or the like, and a shaped object having high mechanical strength is obtained. Compared to the method of filling the cracks with, for example, glass, the extreme compositional bias is reduced, and thus a relatively homogeneous shaped object can be obtained in terms of physical properties other than mechanical strength.

Figure 3:
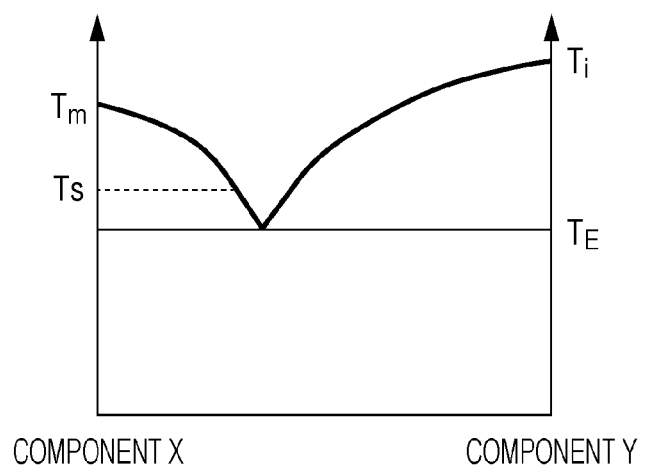
FIG. 3 is an example of a phase diagram illustrating the relationship between the composition ratio of component X to component Y and the temperature and state at the composition ratio, when component X and component Y are in a eutectic relationship.

There are many possible combinations of components X and Y. Among these, component Y, which is an oxide of a metal element contained in the inorganic particles, and component X, which is a compound contained in the shaped ceramic object and which can form a eutectic with component Y, are preferably in a relationship in which the melting point Ti of component Y is higher than the melting point T. of component X. FIG. 3 illustrates an example of a phase diagram representing the relationship between the composition ratio of component X to component Y and the temperature and state at the composition ratio, when component X and component Y are in a eutectic relationship. The horizontal axis represents the composition ratio. Component X is 100% at the left end. At a position closer to the right end, the percentage of component X is lower, and the percentage of component Y is higher.

Letting the melting point of component X be $T_m$, letting the melting point of component Y be $T_i$, and letting the eutectic point of component X and component Y be $T_E$, these temperatures satisfy the following relationships: $T_E<T_m$, and $T_E<T_i$. In this case, the maximum temperature $T_S$, which is an attained temperature of the shaped object during the heat treatment performed after the absorption of the metal component-containing liquid, is preferably set so as to satisfy the relationship: $T_E T_S<T_m$. $T_E$ and $T_S$ are each set to be lower than the melting point $T_a$ of the shaped object. When $T_m<T_i$, a high effect can be provided even if the number of times of absorption of the metal component-containing liquid and the number of times of heating are small. The reason for this is that as illustrated in FIG. 3, when $T_m<T_i$, the eutectic composition of component X and component Y is in a state in which the proportion of component X is high, and the regions near the cracks can be melted at the eutectic temperature in a state in which the proportion of component Y is low. It should be noted that $T_m<T_i$ is a preferable condition and is not an essential condition.

For example, when the main component of the shaped object is aluminum oxide ($Al_2O_3$, melting point $T_m=2,070°$ C.), the main component of the inorganic particles in the metal component-containing liquid is preferably a component that can be formed into zirconium oxide ($ZrO_2$, melting point $T_i=2,715°$ C.) by heating. In this case, the metal element contained in the inorganic particles is zirconium. Examples of candidate inorganic particles that can be formed into zirconium oxide by heating include zirconium (metal), zirconium oxide, zirconium hydroxide, and zirconium chloride. Zirconium chloride is a sublimable solid and can be formed into zirconium oxide via zirconyl chloride hydrate and so forth. $Al_2O_3$ and $ZrO_2$ are in a relationship in which a eutectic can be formed, and the eutectic point $T_E$ is about 1,840° C. That is, $Al_2O_3$ and $ZrO_2$ are a combination that satisfies the aforementioned preferred relationship: $T_m<T_i$. Accordingly, $ZrO_2$ is formed from the metal element contained in the metal component-containing liquid at regions near the cracks; thus, the maximum temperature $T_S$ during the heat treatment can be set in the range of 1,840° C.≤TS<2,070° C. The regions near the cracks can be selectively melted at a temperature sufficiently lower than the melting point of $Al_2O_3$ to reduce or eliminate the cracks.

When the shaped object contains two components of $Al_2O_3$ and $GdAlO_3$, the melting point of the shaped object is determined in accordance with the composition ratio of the two components. For example, when the shaped object contains the two components in a eutectic composition, the melting point $T_a$ of the shaped object is about 1,720° C. (eutectic point). In such a case, the metal component-containing liquid preferably contains inorganic particles mainly composed of a component that can be formed into zirconium oxide by heating. The melting point $T_i$ of $ZrO_2$ is 2,715° C. The eutectic point $T_E$ of the three components of $Al_2O_3$, $GdAlO_3$, and $ZrO_2$ is about 1,662° C. Thus, heating can be performed at a temperature $T_S$ sufficiently lower than a melting point $T_a$ of the shaped object of about 1,720° C. to reduce or eliminate the cracks.

There are other possible combinations of at least one compound contained in the shaped object and a metal oxide, which is an oxide of a metal element contained in the inorganic particles. Preferred examples of combinations that satisfy the relationship, the melting point $T_m$ of component $X<T_i$, include, but are not limited to, [$SiO_2$] and $ZrO_2$, [$SiO_2$] and $Al_2O_3$, [$Al_2O_3$] and MgO, [$Al_2O_3$] and $HfO_2$, [$Al_2O_3$ and $ReAlO_3$ (where Re represents a rare-earth element)] and $ZrO_2$, [$Al_2O_3$ and $Re_3Al_5O_{12}$ (where Re represents a rare-earth element)] and $ZrO_2$, [$Al_2O_3$ and $ReAlO_3$ (where Re represents a rare-earth element)] and $HfO_2$, [$Al_2O_3$ and $Re_3Al_5O_{12}$ (where Re represents a rare-earth element)] and $HfO_2$, [$Mg_2Al_4Si_5O_{18}$] and $Mg_2SiO_4$, and [$Mg_2Al_4Si_5O_{18}$] and $MgSiO_3$. In the above description, the phase that is contained in the shaped object and can correspond to component X is given in [ ], and the phase of the metal oxide is given following [ ].

The metal component-containing liquid containing the metal element that will be used as component Y is preferably used for a shaped ceramic object having a component Y content of less than 3% by mole. Such a combination facilitates localized melting only the regions near the cracks by heating to suppress the deformation of the shaped object. The component Y content of the shaped ceramic object that absorbs the metal component-containing liquid is more preferably less than 2% by mole, even more preferably less than 1% by mole.

As described above, in order to eliminate the cracks, it is necessary to allow a suitable amount of component Y to be present on the surfaces of the portions of the shaped object facing the cracks. The amount of component Y present on the surfaces of the portions of the shaped object facing the cracks may be adjusted, for example, by adjusting the number of times of absorption of the metal component-containing liquid by the shaped object, the inorganic particle content of the metal component-containing liquid, and the particle size of the inorganic particles, in accordance with the size and shape of the shaped object used for the absorption.

In the present invention, the inorganic particle content of the metal component-containing liquid is not limited to a particular value. There is a preferred content depending on the purpose.

At a high inorganic particle content of the metal component-containing liquid, a large amount of component Y can be provided to the surfaces of the portions of the shaped object facing the cracks by performing the step (ii) once. Thus, even when the steps (ii) and (iii) are performed less frequently, the cracks can be sufficiently reduced or eliminated. From this point of view, the inorganic particle content of the metal component-containing liquid is preferably 25% or more by weight, more preferably 30% or more by weight. In the case of a high inorganic particle content of the metal component-containing liquid, the amount of component Y provided to the surfaces of the portions of the shaped object facing the cracks per one operation of the step (ii) may be too large, and thus wide regions around the cracks may be easily melted. To maintain the shape accuracy of the shaped object, the metal component-containing liquid preferably has an inorganic particle content of 80% or less by weight, more preferably 75% or less by weight.

In summary, the inorganic particle content of the metal component-containing liquid is preferably 25% or more by weight and 80% or less by weight, more preferably 30% or more by weight and 75% or less by weight in order to shorten the time of the heat treatment while maintaining the shape of the shaped object, although the content varies depending on the components contained in the shaped object and the size of the shaped object.

The inorganic particle content of the metal component-containing liquid used to a shaped object having a fine shape is preferably less than 50% by weight, more preferably less than 40% by weight.

From the above-mentioned perspective, it is also preferable to use a dispersion having a high inorganic particle content to reduce the cracks efficiently to some extent in the initial stage of the crack repair process, and then use a dispersion having a low inorganic particle content to reduce or eliminate the cracks in the finishing stage. In this way, the combination use of multiple types of metal component-containing liquids having different inorganic particle contents can reduce or eliminate cracks more efficiently while achieving high shape accuracy.

The inorganic particles may be prepared by crushing each material by a top-down method, and may be synthesized from a metal salt, a hydrate, a hydroxide, a carbonate, or the like by a bottom-up method using a technique, such as a hydrothermal reaction. Commercially available inorganic particles may also be used.

The metal component-containing liquid contains an organic solvent or water as a solvent for dispersing the inorganic particles. Specifically, it contains alcohol, ketone, ester, ether, ester-modified ether, hydrocarbon, halogenated hydrocarbon, amide, water, oil, or a mixture of two or more of these solvents. Preferred examples of the alcohol include methanol, ethanol, 2-propanol, isopropanol, 1-butanol, and ethylene glycol. Preferred examples of the ketone include acetone, methyl ethyl ketone, methyl isobutyl ketone, and cyclohexanone. Preferred examples of the ester include ethyl acetate, propyl acetate, butyl acetate, 4-butyrolactone, propylene glycol monomethyl ether acetate, and methyl 3-methoxypropionate. Preferred examples of the ether include ethylene glycol monomethyl ether, diethylene glycol monobutyl ether, butyl carbitol, 2-ethoxyethanol, 1-methoxy-2-propanol, and 2-butoxyethanol. A preferred example of the modified ether is propylene glycol monomethyl ether acetate. Preferred examples of the hydrocarbon include benzene, toluene, xylene, ethylbenzene, trimethylbenzene, hexane, cyclohexane, and methylcyclohexane. Preferred examples of the halogenated hydrocarbon include dichloromethane, dichloroethane, and chloroform. Preferred examples of the amide include dimethylformamide, N,N-dimethylacetamide, and N-methylpyrrolidone. Preferred examples of the oil include mineral oil, vegetable oil, wax oil, and silicone oil.

To allow the particles to be absorbed evenly in the cracks, preferably, the particles do not aggregate or settle in the dispersing liquid and maintain high dispersibility. Thus, the metal component-containing liquid preferably further contains a dispersant.

As the dispersant, at least one of organic acids, silane coupling agents, and surfactants is preferably contained. Preferred examples of organic acids include acrylic acid, 2-hydroxyethyl acrylate, 2-acryloxyethylsuccinic acid, 2-acryloxyethylhexahydrophthalic acid, 2-acryloxyethylphthalic acid, 2-methylhexanoic acid, 2-ethylhexanoic acid, 3-methylhexanoic acid, and 3-ethylhexanoic acid. Preferred examples of silane coupling agents include 3-acryloxypropyltrimethoxysilane, 3-methacryloxypropyltrimethoxysilane, hexyltrimethoxysilane, octyltriethoxysilane, and decyltrimethoxysilane. Preferred examples of surfactants include ionic surfactants, such as sodium oleate, potassium salts of fatty acids, alkyl sodium phosphate, alkylmethylammonium chloride, and alkylamino carboxylate; and nonionic surfactants, such as polyoxyethylene lauric fatty acid ester and polyoxyethylene alkylphenyl ether.

In order to allow the metal component-containing liquid to be absorbed to the center of the shaped object and to suppress thick deposition of the metal component-containing liquid on the surface of the shaped object, a lower viscosity of the metal component-containing liquid is preferred, and a viscosity of 12 mPa-s or less at 20° C. is particularly preferred.

The metal component-containing liquid may be prepared by any method. The metal component-containing liquid is preferably prepared by mixing the inorganic particles, the dispersant, and the solvent. The metal component-containing liquid may be prepared by mixing all of them at once. The metal component-containing liquid may be prepared by mixing the particles with the dispersant, adding the solvent, and performing mixing, by mixing the particles with the solvent, adding the dispersant, and performing mixing, or by mixing the dispersant with the solvent and then mixing the particles.

The metal component-containing liquid is as described above. When the shaped ceramic object is mainly composed of aluminum oxide, a metal component-containing liquid that contains inorganic particles containing zirconium oxide as a main component is preferred.

Any method for allowing the shaped object to absorb the metal component-containing liquid can be employed as long as the inorganic particles can be uniformly deposited on the faces constituting the cracks in the shaped object. The shaped object may be impregnated with the metal component-containing liquid by immersing the shaped object in the metal component-containing liquid. The shaped object may be allowed to absorb the metal component-containing liquid by spraying the metal component-containing liquid on the shaped object or applying the metal component-containing liquid to the surface with a brush. These multiple methods may be combined, or the same method may be repeated multiple times.

When the volume of the shaped object obtained by repeating the step (i) many times is large, it is preferable to subject the shaped object to immersion in the metal component-containing liquid and degassing under reduced pressure in order to sufficiently distribute the inorganic particles to the interior of the shaped object. Alternatively, the shaped object may be placed in a sealed container, degassed under reduced pressure, and then immersed in the metal component-containing liquid.

Step (iii)

In the step (iii), the shaped ceramic object that has absorbed the metal component-containing liquid is subjected to heat treatment.

In the step (ii), the inorganic particles are widely distributed in the surface layer of the shaped object and in the cracks inside the shaped object. For example, in the case of a shaped object that is mainly composed of aluminum oxide and that has absorbed a metal component-containing liquid that contains zirconium oxide particles dispersed therein, only regions near cracks locally have compositions close to the eutectic composition of $Al_2O_3$ and $ZrO_2$. Thus, only the regions near the cracked portions have lower melting points than regions away from the cracks. Using this difference in melting point, heating is performed at a temperature higher than or equal to the eutectic point of at least one compound contained in the shaped object and the metal oxide of the metal element contained in the inorganic particles and lower than the melting point of the material of the shaped object.

Here, heating is performed at a temperature higher than or equal to the eutectic point of $Al_2O_3$ and $ZrO_2$ and lower than the melting point of $Al_2O_3$. As a result, only the regions of the shaped object where the inorganic particles are present, that is, only the regions near the cracks in the shaped object, are partially melted while the shape of the shaped object is maintained.

In the case where the shaped object is composed of two components and where these two components and zirconium oxide are in a relationship in which a three-component eutectic (three-phase eutectic) is formed, the eutectic point of these three components is lower than the eutectic point of the two components. In this case, the step (iii) can be performed at an even lower temperature than when the shaped object is composed of a single component, and nonuniformity in temperature in the shaped object during heating can be reduced even when the shaped object is relatively large in size, which is more preferred. In the case where an article to be manufactured is composed of an oxide, the step (iii) can be easily performed in an electric furnace in an air atmosphere when the temperature is relatively low.

For example, $Al_2O_3$—$Gd_2O_3$ is a material that can form a three-phase eutectic with zirconium oxide. Thus, when a shaped object formed from a powder containing $Al_2O_3$—$Gd_2O_3$ as a component is allowed to absorb the metal component-containing liquid that contains inorganic particles containing zirconium element as a component in the step (ii), a certain amount of inorganic particles containing zirconium element is provided to the faces constituting the cracks in the shaped object. When heat treatment is performed in this state, the zirconium element present on the faces constituting the cracks in the shaped object is formed into, for example, zirconium oxide during the heat treatment. In regions near zirconium oxide present on the surfaces of the portions of the shaped object facing the cracks, $Al_2O_3$—$Gd_2O_3$ in an amount such that the composition ratio of $Al_2O_3$—$Gd_2O_3$ is at or near the composition ratio at which a three-phase eutectic can be formed with the amount of zirconium oxide, melts at a temperature lower than the melting point of the shaped object. Subsequently, $Al_2O_3$—$Gd_2O_3$ recrystallizes to contribute to the repair of cracks.

In this way, when the composition ratios of the regions near the cracks are close to the composition ratio at which the three-phase eutectic can be formed, the melting point can be significantly lowered locally. Using this difference in melting point, heating can be performed at a temperature of higher than or equal to the eutectic point of the above-described three phases and lower than the melting point of the shaped object to selectively and locally melt only the regions near the cracks.

Specifically, the cracks can be reduced or eliminated by heat treatment such that the maximum temperature of the regions of the shaped object near the cracks is in the range of 1,600° C. to 1,710° C., the shaped object having been formed from a powder containing $Al_2O_3$—$Gd_2O_3$ as a component and having been subjected to the step (ii). In this case, the maximum temperature is more preferably 1,662° C. or higher and lower than 1,710° C. from the viewpoint of achieving a temperature of higher than or equal to the eutectic point of the three phases of $Al_2O_3$, $Gd_2O_3$, and $ZrO_2$, and lower than the lowest possible melting point (about 1,720° C.) of the $Al_2O_3$—$Gd_2O_3$-based shaped object. As described above, in order to melt only the regions near the cracks, the temperature of the heat treatment performed after the metal component-containing liquid is absorbed into the cracks of the shaped object needs to be set appropriately. When component X contained in the shaped object and inorganic oxide component Y that is the main component of the particles are in a eutectic relationship illustrated in the phase diagram of FIG. 3, the maximum temperature $T_S$, which is an attained temperature of the shaped object during the heat treatment in the step (iii), is preferably set so as to satisfy $T_E \leq T_S < T_m$, more preferably $T_E \leq T_S < T_m - (T_m - T_E)/2$. This makes it possible to selectively melt the regions near the cracks at a sufficiently lower temperature than the melting point T. of the shaped object to reduce or eliminate the cracks, thus facilitating the maintenance of the shape of the shaped object.

Any heating time can be used as long as the temperature of the regions near the cracks reaches the maximum temperature mentioned above. Specifically, in the step (iii), the shaped object may be heated at a temperature that the regions near the cracks should reach. It is considered that the cracks and the regions near the cracks are melted and moved in the direction of decreasing the surface energy by heating at such a temperature to reduce and eliminate the cracks. As the heating progresses, diffusion occurs into the crystalline and amorphous portions of the shaped object, and the crystals recrystallize with the metal oxide component contained. The action seemingly has the effect of enhancing the mechanical strength of the shaped object, compared with a method in which the cracks are simply filled with glass by infiltration of the cracks with the glass.

When the inorganic particles are present on the faces constituting the cracks of the shaped object, the regions near the cracks melt, and this is effective in reducing or eliminating the cracks, as described above.

The amount of inorganic particles in the regions near the cracks may be adjusted by adjusting, for example, the inorganic particle content of the metal component-containing liquid, the method for allowing the metal component-containing liquid to be absorbed into the cracks, and the number of times thereof.

For example, in the case of a shaped object mainly composed of aluminum oxide, the regions near the cracks are more easily melted when the compositions of the regions near the cracks are closer to the eutectic composition, i.e., 62% by mole aluminum oxide and 38% by mole zirconium oxide, in the shaped object mainly composed of aluminum oxide. To selectively melt the regions near the cracks and reduce or eliminate the cracks, when the eutectic point of aluminum oxide and zirconium oxide is about 1,840° C., heating is preferably performed at a temperature of 1,840° C. or higher and 2,070° C. or lower, more preferably 1,850° C. or higher and 2,060° C. or lower.

In the case of a shaped object formed from a powder containing $Al_2O_3$—$Gd_2O_3$ as a component, the shaped object contains a phase containing $Al_2O_3$ as a main component and a phase containing $GdAlO_3$ as a main component. As described above, the shaped object may be allowed to absorb the metal component-containing liquid that contains zirconium oxide (step (ii)) and be heated at a temperature of 1,662° C. or higher and 1,710° C. or lower (step (iii)). The component of zirconium oxide particles entering the shaped object through the cracks diffuses into the crystalline and amorphous portions of the shaped object and recrystallizes. As a result, the resulting ceramic article has a three-phase eutectic: a phase containing $ZrO_2$, as a main component, with a fluorite structure, a phase containing $Al_2O_3$ as a main component, and a phase containing $GdAlO_3$ as a main component. When a terbium oxide ($Tb_4O_7$) powder is added as an accessory component to a powder containing $Al_2O_3$—$Gd_2O_3$ as a component, the shaped object contains a phase containing $Al_2O_3$ as a main component and a phase containing $(GdTb)AlO_3$ as a main component. In this case, heating at a temperature of 1,662° C. or higher and 1,710° C. or lower (step (iii)) can reduce or eliminate the cracks as well.

The shaped object immediately after it is formed in the step (i) contains a large amount of amorphous components because it has been rapidly cooled and solidified after melting by energy beam irradiation. The metal component-containing liquid to be absorbed in the step (ii) in the method for manufacturing a ceramic article according to the present invention is appropriately selected on the basis of the component contained in the shaped object, thereby enabling most of the amorphous components contained in the shaped object to be transformed into crystalline components during the heat treatment in the step (iii). During the heat treatment, high mechanical strength can be obtained by heating the shaped object for a certain period of time or longer, and by allowing the oxide of the metal element contained in the inorganic particles to diffuse sufficiently into the crystalline portions of the shaped object and recrystallize. The holding time of the maximum temperature $T_s$ in the step (iii) is preferably, in total, 1 minute or more, more preferably 5 minutes or more. An excessively long heat treatment time may result in an excessively large grain size of the crystalline grains contained in the shaped ceramic object, leading to a decrease in mechanical strength. Accordingly, the holding time of the maximum temperature $T_s$ in the step (iii) is preferably, in total, 2 hours or less, more preferably 1 hour or less, even more preferably 30 minutes or less.

In the present invention, the time of the heat treatment refers to the holding time at the maximum temperature $T_s$ of the heat treatment in the step (iii), unless otherwise specified. When the step (iii) is performed once, the accumulated holding time of the heat treatment refers to the holding time at the maximum temperature $T_s$ of the heat treatment. When the step (iii) is repeated a predetermined number of times, the accumulated holding time refers to the total holding time at the maximum temperature Ts in the operations.

Any heating method can be employed. The heating may be performed by irradiating the shaped ceramic object that has absorbed the metal component-containing liquid with an energy beam again, or by placing the shaped ceramic object in an electric furnace. In the case of heating with the energy beam, the relationship between the amount of heat input from the energy beam and the temperature of the shaped object needs to be determined in advance with, for example, a thermocouple in order to heat the shaped object in the preferred temperature range described above. An electric furnace that can adjust the rate of temperature decrease after heating is preferred because it can heat the entire shaped object and also control the cooling temperature, thus preventing the formation of new cracks.

When the steps (ii) and (iii) are repeatedly performed, the oxide of the metal element contained in the inorganic particles diffuses into the shaped object with each cycle, as long as the cracks are not eliminated from the shaped object. This reduces the difference in the concentration of the components originating from the particles between the regions near the cracks and the other portions of the shaped object to reduce the difference between the melting point (eutectic point) of the regions near the cracks and the melting point of the other portions of the shaped object. From the viewpoint of melting only the regions near the cracks, the difference in melting point is preferably 20° C. or higher, more preferably 30° C. or higher. For example, in the case of a shaped object that is formed from a powder containing aluminum oxide as a main component, the shaped object preferably contains the zirconium oxide component in an amount of less than 3% by mole, more preferably less than 2% by mole, even more preferably less than 1% by mole, because only the regions near the cracks can be melted while suppressing a change in the shape of the shaped object. A ceramic article in which the crystalline grains have a small grain size and in which the cracks that affect the mechanical strength are sufficiently reduced has significantly enhanced mechanical strength. Such a ceramic article can be obtained by minimizing the heat treatment time required to reduce the cracks and thus controlling the grain growth.

In the case of using a powder composed of multiple types of materials, such as a main component and an accessory component, e.g., an absorber, the accumulated holding time of the heat treatment in the step (iii) is preferably minimized. A ceramic article having a phase-separated structure containing three different phases is obtained, the three different phases including a phase of a main component and two composite compound phases each containing at least one metal element contained in the main component. As will be described in detail below, a ceramic article having such a phase-separated structure has better mechanical strength than a ceramic article composed of one or two phases.

Ceramic Article

A ceramic article of the present invention is an article that is manufactured by an additive manufacturing technology and that contains a ceramic material as a main component, and is characterized by having both a freely-designed shape, which is a feature of the additive manufacturing technology, and superior mechanical strength. Among additive manufacturing technologies, a powder bed fusion process or a directed energy deposition process is preferably used for the manufacture thereof.

A ceramic article having superior mechanical strength can be manufactured, as described above, by performing additive manufacturing using a powder composed of multiple materials and reducing the accumulated holding time of the heat treatment after the resulting shaped object is allowed to absorb the metal component-containing liquid that contains an appropriate component. The resulting ceramic article having significantly enhanced mechanical strength has a phase-separated structure having three or more phases, including a phase of a main component and phases of two composite compounds each containing at least one metal element contained in the main component.

Preferred examples of the main component include aluminum oxide, silicon oxide, mullite, and cordierite. Among them, aluminum oxide is widely used as a general-purpose structural ceramic material and has relatively high thermal conductivity; thus, aluminum oxide is suitable for the additive manufacturing technology using a direct shaping process.

Hereinafter, a ceramic article containing aluminum oxide as a main component will be described as an example, but the technical idea is not limited to the ceramic article containing aluminum oxide as a main component.

When a powder containing an aluminum oxide powder and, for example, a gadolinium oxide powder as an accessory component is irradiated with an energy beam and melted and solidified (step (i)), a shaped object composed mainly of an $Al_2O_3$ phase, a $GdAlO_3$ phase, and a $Gd_2O_3$ phase can be formed because aluminum oxide and gadolinium oxide are in a relationship in which a eutectic can be formed.

The ceramic article obtained by allowing the shaped object to absorb the metal component-containing liquid (step (ii)) and performing the heat treatment (step (iii)) can contain the $GdAlO_3$ phase, a $Gd_4Al_2O_9$ phase, the $Gd_2O_3$ phase, and phases derived from inorganic particles of the metal component-containing liquid, in addition to the $Al_2O_3$ phase, in the case of a short accumulated holding time of the heat treatment. In this case, when the cracks in the ceramic article are sufficiently reduced, the ceramic article exhibits better mechanical strength than a ceramic article obtained by heat treatment for a long time.

The factors for obtaining superior mechanical strength seem to be the grain size of the crystalline grains and the presence of the composite compound phase in the ceramic article.

In the case of a short accumulated holding time of the heat treatment in the step (iii), the heat treatment is completed before the formation of coarse grains, thereby resulting in a ceramic article having a small grain size and superior mechanical strength. The grain size is preferably 20 μm or less, more preferably 15 μm or less, even more preferably 10 μm or less.

The presence of multiple composite compounds forms a complex phase-separated structure having many types of phases in the ceramic article. In addition, the composite compounds typically have higher toughness than the main component, in many cases. Thus, the complex phase-separated structure seems to contribute to the improvement of the mechanical strength.

The composite compounds are considered to be formed from the main and accessory components during the melting and solidification of the step (i) and/or the heat treatment of the step (iii). For example, in the case of using a powder containing an aluminum oxide powder as a main component and a gadolinium oxide powder as an accessory component, the $GdAlO_3$ and $Gd_4Al_2O_9$ phases described above correspond to the composite compounds. $GdAlO_3$ is seemingly formed mainly by eutectic formation with $Al_2O_3$ in the step (i). The $Gd_4Al_2O_9$ phase is considered to be formed mainly by the solid-state diffusion process of atoms between the $Gd_2O_3$ phase, which is the molten residue of the raw material, and the $Al_2O_3$ and $GdAlO_3$ phases during the heat treatment of the step (iii). Thus, a long accumulated holding time of the heat treatment in the step (iii) results in the elimination of the $Gd_4Al_2O_9$ phase. The phase composition of the ceramic article is in an equilibrium state, and the mechanical strength decreases. Letting the composite compound formed by eutectic formation with the main component in the step (i) be composite compound 1 and letting the composite compound transiently formed in the step (iii) be composite compound 2, a higher percentage of composite compound 2 seemingly results in higher mechanical strength of the ceramic article.

In the case of a ceramic article formed by an additive manufacturing technology from a powder containing a main component and an accessory component, the resulting mechanical strength varies in accordance with the type of main component. The mechanical strength can be further enhanced by repairing cracks by heating for a short period of time, through the mechanism described above. Examples of the main component that can be used include silicon oxide, mullite, and cordierite, in addition to aluminum oxide. Examples of the accessory component include components that can form a eutectic with the main component, absorber components, and sintering aid components.

Preferred examples of a combination of the main and accessory components include $Al_2O_3$—$Gd_2O_3$, $Al_2O_3$—$Tb_4O_7$, $Al_2O_3$—$Gd_2O_3$—$Tb_4O_7$, $Al_2O_3$—$GdAlO_3$—$Tb_4O_7$, $Al_2O_3$—$Pr_6O_{11}$, $Al_2O_3$—$Gd_2O_3$—$Pr_6O_{11}$, $Al_2O_3$—$GdAlO_3$—$Pr_6O_{11}$, $Al_2O_3$—$Y_2O_3$, $Al_2O_3$—$YAlO_3$, $Al_2O_3$—$Y_2O_3$—$Tb_4O_7$, $Al_2O_3$—$YAlO_3$—$Tb_4O_7$, $Al_2O_3$—$Y_3Al_5O_{12}$—$Tb_4O_7$, $Al_2O_3$—$Y_2O_3$—$Pr_6O_{11}$, $Al_2O_3$—$YAlO_3$—$Pr_6O_{11}$, $Al_2O_3$—$Y_3Al_5O_{12}$—$Pr_6O_{11}$, $Al_2O_3$—$ZrO_2$—$Tb_4O_7$, $Al_2O_3$—$ZrO_2$—$Pr_6O_{11}$, $Al_2O_3$—$SiO$, $Al_2O_3$—$Gd_2O_3$—$SiO$, $Al_2O_3$—$GdAlO_3$—$SiO$, $Al_2O_3$—$Y_2O_3$—$SiO$, $Al_2O_3$—$YAlO_3$—$SiO$, $Al_2O_3$—$Y_3Al_5O_{12}$—$SiO$, $Al_2O_3$—$ZrO_2$—$SiO$, $SiO_2$—$Tb_4O_7$, $SiO_2$—$Pr_6O_{11}$, $(MgO$—$Al_2O_3$—$SiO_2)$—$Tb_4O_7$, $(MgO$—$Al_2O_3$—$SiO_2)$—$Pr_6O_{11}$, $(Al_2O_3$—$SiO_2)$—$Tb_4O_7$, and $(Al_2O_3$—$SiO_2)$—$Pr_6O_{11}$. In each of the above combinations, the first component refers to the main component, and the subsequent components refer to the accessory components. In the case of these combinations, composite oxides are formed as composite compounds.

The ceramic article of the present invention preferably contains an additional phase, in addition to the three phases, i.e., the phase of the main component and the phases of the two composite compounds each containing at least one metal element contained in the main component. Preferably, the additional phase is a component derived from the inorganic particles of the metal component-containing liquid used in the step (ii), and the additional phase and at least one of the main component and the two composite compounds contained in the shaped object are in a relationship in which a eutectic can be formed. The presence of a certain amount or more of the component derived from the inorganic particles in the metal component-containing liquid indicates that the cracks have been sufficiently repaired. In addition, the incorporation of the additional phase results in a more complex phase-separated structure of the ceramic article, thereby improving the mechanical strength. From this point of view, the component derived from the inorganic particles of the metal component-containing liquid and the main component are more preferably in a relationship in which a eutectic can be formed. To achieve sufficient mechanical strength, the metal element derived from the inorganic particles contained in the ceramic article is preferably contained in an amount of 0.3% or more by mole, more preferably 0.5% or more by mole, based on the total metal element contained in the ceramic article. An excessively large amount of the component derived from the inorganic particles contained in the ceramic article tends to reduce the shape accuracy of the article. Thus, the metal element derived from the inorganic particles contained in the ceramic article is preferably contained in an amount of 5% or less by mole, more preferably 3% or less by mole, based on the total metal element contained in the ceramic article.

For example, the following describes the case of a ceramic article obtained by irradiating a powder containing an aluminum oxide powder as a main component and a gadolinium oxide powder as an accessory component with an energy beam to perform melting and solidification into a shaped object, allowing the shaped object to absorb a metal component-containing liquid that contains zirconia particles (step (ii)), and performing the heat treatment (step (iii)). The ceramic article obtained in this way can contain, for example, a $GdAlO_3$ phase, a $Gd_4Al_2O_9$ phase, a $Gd_2O_3$ phase, a $ZrO_2$ phase having a fluorite structure, in addition to an $Al_2O_3$ phase. The $ZrO_2$ phase having the fluorite structure is a phase derived from the inorganic particles of the metal component-containing liquid and corresponds to the additional phase described above. The $ZrO_2$ phase having the fluorite structure is a stable phase when the Zr sites are partially replaced with a rare-earth element (in this case, Gd).

The $ZrO_2$ phase having the fluorite structure, which is a phase derived from the inorganic particles of the metal component-containing liquid, is preferably composed of crystalline grains having a smaller grain size than the phase serving as the main component of the ceramic article. This is presumably because the additional phase having a relatively smaller grain size than the main-component phase acts to bond the main-component phase grains together and contributes to the mechanical strength of the ceramic article. The grain size of the additional phase is preferably ½ or less, more preferably ⅓ or less, of the grain size of the phase serving as the main component.

From the viewpoint of obtaining a more complex phase-separated structure, the main component and at least one of the composite compounds are preferably in a relationship in which a eutectic can be formed.

Evaluation Method

Methods for evaluating a shaped object in the present invention will be described below.

Mechanical Strength

The mechanical strength of a shaped object was evaluated by a three-point flexural test based on JIS R1601, which is a standard for testing for flexural strength of fine ceramics at room temperature. The three-point flexural strength was determined by averaging values calculated using the following expression for five test specimens:

$$3 \times P \times L / (2 \le w \times t^2) \quad \text{(expression 1)}$$

where P [N] is the maximum load at break, L [mm] is the distance between external supports, w [mm] is the width of the test specimen, and t [mm] is the thickness of the test specimen.

Relative Density

The relative density [%] was calculated by dividing the bulk density of a shaped object (weight divided by volume) by the theoretical density. The theoretical density was calculated from the crystal structure. The crystal structure was identified by performing X-ray diffraction measurement and Rietveld analysis.

Crystal Structure

A ceramic article was polished to a mirror finish. The crystal structure and composition of the ceramic article were investigated by X-ray diffraction, electron diffraction, SEM-EDX, and TEM-EDX. The phase-separated structure was analyzed by SEM-EBSD.

SEM-EDX and EBSD analyses were simultaneously performed in a field of view of 100 μm×100 μm in size at 10 different locations on the measurement surface described above. Mapping was performed for the composition and the crystalline phases. When a small phase is included, transmission electron microscopy (TEM) can be used to analyze the composition and the crystal structure in the same way.

The grain size of the crystalline grains constituting a phase was calculated by, using EBSD, observing 300 or more crystalline grains in the same phase observed on the measurement surface and calculating the median of the equivalent circular diameters of the crystalline grains.

Composition Analysis

The metal element content of a powder, a shaped object, and a ceramic article were measured by inductively-coupled plasma atomic emission spectrometry (ICP-AES), GDMS, or ICP-MS.

The composition ratios of phases in a shaped object and a ceramic article were measured and calculated using a combination of the crystal structure analysis and the composition analysis as described above.

EXAMPLES

Example 1

An α-$Al_2O_3$ powder having an average particle size of about 20 μm, a $Gd_2O_3$ powder having an average particle size of about 35 μm, and a $Tb_2O_{3.5}$ powder ($Tb_4O_7$ powder) having an average particle size of about 5 μm were provided. These powders were weighed so as to satisfy the following mole ratio: $Al_2O_3$:$Gd_2O_3$:$Tb_2O_{3.5}$=77.4:20.8:1.8. These weighed powders were mixed with a dry ball mill for 30 minutes to obtain a mixed powder (raw material powder).

The composition analysis of the raw material powder by ICP atomic emission spectroscopy revealed that the zirconium oxide content was less than 1% by mole. The same process as illustrated in FIGS. 1A to 1H above was performed to manufacture rectangular parallelepipeds, each measuring 5 mm×42 mm×6 mm, as shaped objects of Example 1 (step (i)).

A ProX DMP 100 (trade name) equipped with a 50-W fiber laser, available from 3D Systems, Inc., was used to form an object.

Figure 4A:
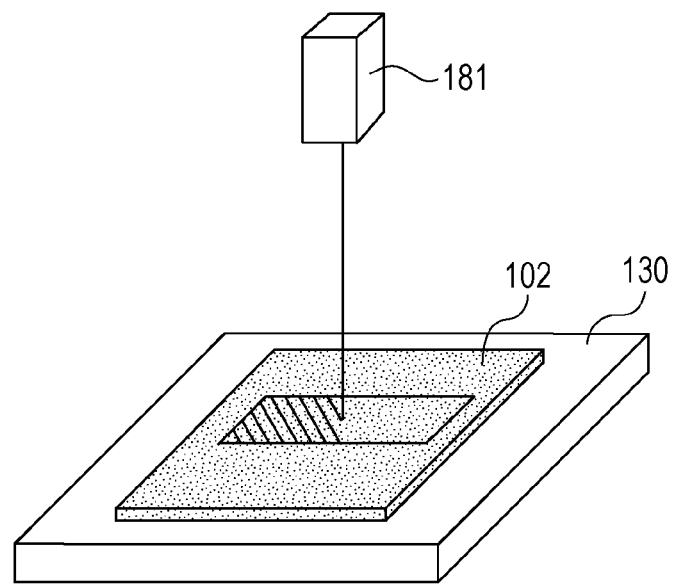
FIG. 4A is a schematic perspective view illustrating a process of irradiating a layer with a laser while scanning the layer with the laser, in an example of the present invention.

A 20-μm-thick powder layer composed of the raw material powder was formed, as the first layer, on the alumina base 130 using a roller (FIGS. 1A and 1B). A 30-W laser beam was scanned at a drawing speed of 140 mm/s and a drawing pitch of 100 μm. As illustrated in FIG. 4A, the powder was irradiated with the laser beam while scanning the laser beam in such a manner that drawing lines were at 45° diagonally to each side of a rectangle, to melt and solidify the powder within a rectangular area of 5 mm×42 mm, thereby forming a solidified portion 100 (FIG. 1C).

Figure 4B:
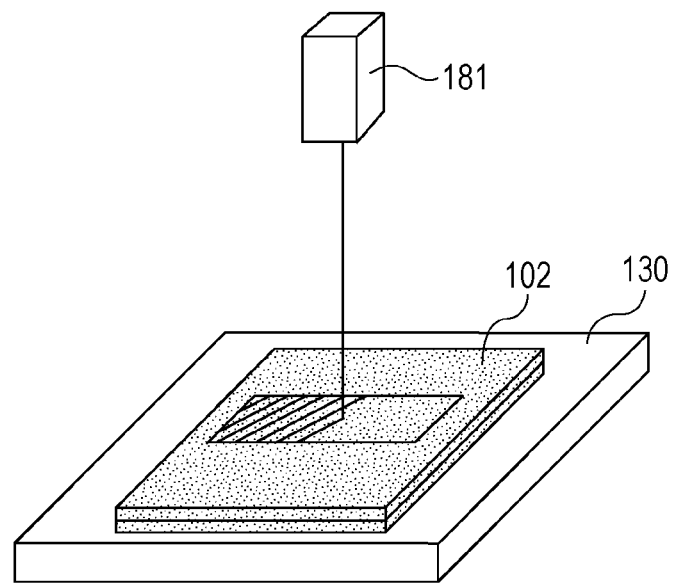
FIG. 4B is a schematic perspective view illustrating a process of irradiating a layer to be formed after FIG. 4A with a laser while scanning the layer with the laser.

Next, a new 20-μm-thick powder layer was formed with the roller so as to cover the solidified portion 100. The powder layer was irradiated with a laser beam while scanning the laser beam, so that the material powder in the rectangular area of 5 mm×42 mm was melted and solidified to form a solidified portion 100 (FIGS. 1D and 1E). As illustrated in FIG. 4B, the laser was scanned in the direction perpendicular to the drawing lines of the first layer to melt and solidify the powder. This process was repeated until the height of the solidified portions was 6 mm, and five shaped objects each measuring 42 mm×5 mm×6 mm were manufactured.

Figure 5:
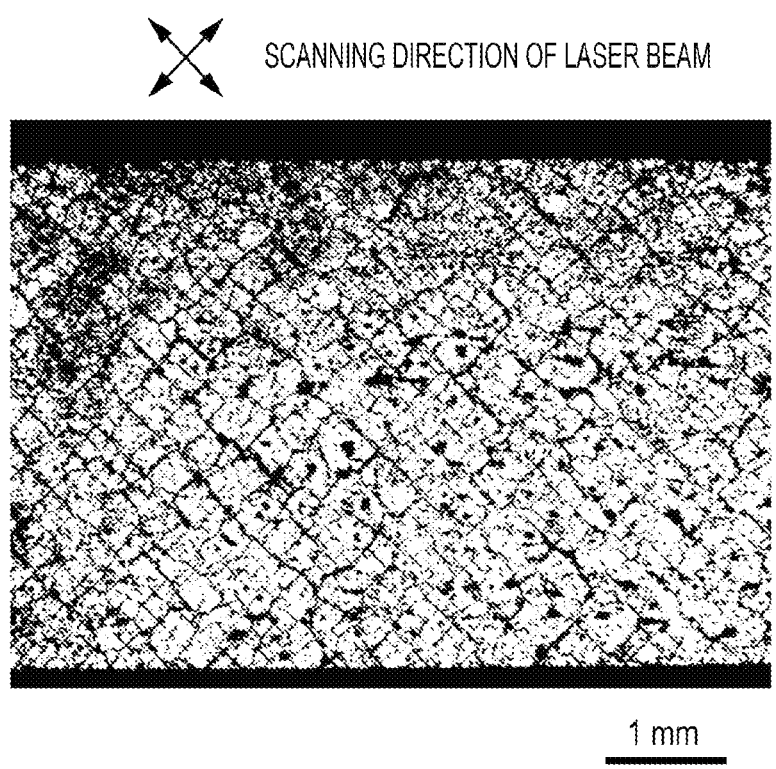
FIG. 5 is an optical microscope image of a ceramic article obtained in Example 1.

Observation of the surfaces of these shaped objects with an optical microscope revealed that each of the shaped objects had a surface roughness Ra of 20 μm or less. FIG. 5 is an image obtained with the optical microscope. As can be seen from FIG. 5, cracks were formed in accordance with the drawing directions of the laser beam. That is, there were cracks extending in directions inclined at about 45° to each side of the rectangle.

Each of the shaped objects was separated from the alumina base and polished to provide a shaped object, measuring 40 mm in width×4 mm in depth×3 mm in height, for a three-point flexural strength test. Observation of the polished surface by SEM revealed that cracks having a width of several nanometers to several micrometers were formed in accordance with the drawing directions of the laser beam. Similar to the results of the optical microscope observation, grid-like cracks were formed in directions inclined at about 45° to each side of the rectangle.

Zirconium oxide-containing solution 1 that contained zirconium oxide particles was used as a metal component-containing liquid. Zirconium oxide can form a eutectic with aluminum oxide, which was the main component of the shaped object.

As the particles, zirconium oxide particles (available from Kanto Denka Kogyo Co., Ltd.) having an average particle size of 10 nm were used. As dispersants, 2-hydroxyethyl acrylate and 3-acryloxypropyltrimethoxysilane were used. As a solvent, propylene glycol monomethyl ether acetate was used. These were mixed together in such a manner that the resulting dispersion had a zirconium oxide content of 70% by weight. The dispersion was uniformly stirred to prepare zirconium oxide-containing liquid 1.

The above-mentioned shaped objects processed for the test were immersed in zirconium oxide-containing liquid 1, degassed under reduced pressure for 1 minute to allow the liquid to be absorbed into the inside of the shaped objects, and then dried naturally for 1 hour (step (ii)).

Then, the shaped objects that had absorbed zirconium oxide-containing liquid 1 were placed in an electric furnace and heated. In an air atmosphere, the temperature was increased to 1,670° C., which is higher than or equal to the eutectic point (1,662° C.) of the three phases of aluminum oxide, gadolinium oxide, and zirconium oxide and lower than or equal to the melting point (1,720° C.) of the shaped object, over a period of 2 hours and held at 1,670° C. for 10 minutes (step (iii)). After that, the energization was terminated, and the shaped objects were naturally cooled to obtain ceramic articles of Example 1. In Example 1, five ceramic articles for the three-point flexural strength test were manufactured by conducting the step of allowing the respective shaped objects to absorb zirconium oxide-containing liquid 1 (step (ii)) and the step of performing heat treatment (step (iii)) once each.

The dimensional accuracy of the resulting ceramic articles was evaluated. Specifically, the dimensional accuracy (sometimes referred to as "shape accuracy") is the rate of change in the length of each side of the articles obtained after the steps (ii) and (iii) with respect to the length of each side of the shaped objects before the steps (ii) and (iii). The dimensional accuracy of Example 1 was within 1% on each side with respect to the dimensions of each shaped object (40 mm in width×4 mm in depth×3 mm in height) after polishing and before the steps (ii) and (iii). Before and after the steps (ii) and (iii), the ratio of the length of each side of each shaped object was substantially the same. There was no deformation or surface unevenness. The shaped objects and the ceramic articles were similar in shape.

The average value of the relative density was 95.9%.

For the three-point flexural test, a compression tester, available from Instron, was used. The five ceramic articles of Example 1 were tested, and the average value of the three-point flexural strength was 173 MPa.

The analysis of the phases in the ceramic articles revealed five phases: a phase composed of $Al_2O_3$, a phase composed of $GdAlO_3$ (composite compound 1), a phase composed of $Gd_4Al_2O_9$ (composite compound 2), a phase composed of $Gd_2O_3$, and a phase composed mainly of zirconium oxide having a fluorite structure. The XRD results revealed that the $Gd_4Al_2O_9$ phase, which is considered to contribute significantly to the mechanical strength, was present in the ceramic articles in an amount of 4% by weight. The main metal elements contained in the phase composed mainly of zirconium oxide having the fluorite structure were Zr, Gd, and Tb, and the metal elements other than Zr, Gd, or Tb were less than 1% by mole. Among the metal elements contained in the phase composed mainly of zirconium oxide having the fluorite structure, the proportion of rare-earth elements, Gd and Tb, was 30% by mole on average. The phase composed mainly of zirconium oxide was not unevenly distributed in each article. This indicated that the zirconium oxide component diffused into the shaped object through the cracked portions and recrystallized as a phase-separated structure while incorporating rare-earth elements.

The amount of Zr contained in each of the ceramic articles was examined. Among the metal elements contained in each ceramic article in this Example, the amount of Zr was 0.7% by mole. The articles obtained in this Example and the following Examples may have a state in which Tb is dissolved in the Gd sites in the phase containing Gd as a constituent element as described above.

The average grain size of the crystalline grains contained in the ceramic articles was measured by EBSD and found to be 4.5 μm.

These results suggest that the ceramic articles having high mechanical strength were obtained owing to the complex phase-separated structure of multiple phases, the presence of composite compounds having higher toughness than the main component, and crystalline grains having a small grain size.

Example 2

Five shaped objects, each measuring 40 mm in width×4 mm in depth×3 mm in height, were manufactured for the three-point flexural strength test (step (i)) as in Example 1, except that the shaping conditions were adjusted using a ProX DMP 200 (trade name), available from 3D Systems, Inc., equipped with a 300-W fiber laser. The shaping conditions were set as follows: a laser beam power of 294 W (98% of 300 W), a drawing speed of 1,000 mm/s, and a drawing pitch of 100 μm.

Observation of the surfaces of these shaped objects with an optical microscope revealed that each of the shaped objects had a surface roughness Ra of 20 μm or less.

Each of the five shaped objects was separated from the alumina base and polished to provide a shaped object, measuring 40 mm in width×4 mm in depth×3 mm in height, for a three-point flexural strength test. Observation of the polished surface by SEM revealed that cracks having a width of several nanometers to several micrometers were formed in accordance with the drawing directions of the laser beam. Similar to the results of the optical microscope observation, grid-like cracks were formed in directions inclined at about 45° to each side of the rectangle.

The step (ii) of allowing the shaped objects to absorb zirconium oxide-containing liquid 1 and the step (iii) of heating the objects were performed as in Example 1 to manufacture five ceramic articles. The resulting ceramic articles were analyzed for the three-point flexural strength, the dimensional accuracy, the relative density, and the crystal structures and compositions of the phases contained in the ceramic articles, as in Example 1.

The dimensional accuracy of the ceramic articles obtained in Example 2 was as good as 1% or less. As with the ceramic articles in Example 1, the shape of the shaped objects was almost unchanged before and after the steps (ii) and (iii), and maintained a similar shape.

The analysis of the phases in the ceramic articles revealed five phases: a phase composed of $Al_2O_3$ (main component), a phase composed of $GdAlO_3$ (composite compound 1), a phase composed of $Gd_4Al_2O_9$ (composite compound 2), a phase composed of $Gd_2O_3$, and a phase composed mainly of zirconium oxide having a fluorite structure. The XRD results revealed that the phase of $Gd_4Al_2O_9$ (composite compound 2), which is considered to contribute significantly to the mechanical strength, was present in the ceramic articles in an amount of 4% by weight. The main metal elements contained in the phase (corresponding to the additional phase described above) composed mainly of zirconium oxide having the fluorite structure were Zr, Gd, and Tb, and the metal elements other than Zr, Gd, or Tb were less than 1% by mole. Among the metal elements contained in the phase composed mainly of zirconium oxide having the fluorite structure, the proportion of rare-earth elements was 30% by mole on average. The phase composed mainly of zirconium oxide was not unevenly distributed. This indicated that the zirconium oxide component diffused into the shaped object through the cracked portions and recrystallized as a phase-separated structure while incorporating rare-earth elements. The amount of Zr contained in each of the ceramic articles was examined. Among the metal elements contained in each ceramic article in this Example, the amount of Zr was 0.7% by mole.

The grain size of the crystalline grains contained in the ceramic articles was measured by EBSD and found to be 4.0 μm.

The complex phase-separated structure of these multiple phases, the presence of composite compounds having higher toughness than the main component, and the small grain size presumably result in the ceramic articles having high mechanical strength.

Example 3

Shaped objects each measuring 40 mm in width×4 mm in depth×3 mm in height were manufactured for the three-point flexural strength test (step (i)) as in Example 1. Observation of the surfaces of the shaped objects of Example 3 with an optical microscope revealed that each of the shaped objects had a surface roughness Ra of 20 µm or less.

Fine zirconium oxide particles (available from Kanto Denka Kogyo Co., Ltd.) having an average particle size of 10 nm and 2-hydroxyethyl acrylate and 3-acryloxypropyltrimethoxysilane, serving as dispersants, were mixed together, and the mixture was uniformly stirred. Propylene glycol monomethyl ether acetate, serving as a solvent, was added thereto in such a manner that the resulting dispersion had a zirconium oxide content of 70% by weight. The resulting mixture was uniformly stirred to prepare zirconium oxide-containing liquid 2.

The step (ii) of allowing the shaped objects to absorb zirconium oxide-containing liquid 2 described above and the step (iii) of heating the objects were performed under the same conditions as in Example 1 to manufacture five ceramic articles of Example 3.

The resulting ceramic articles were analyzed for the three-point flexural strength, the dimensional accuracy, the relative density, and the crystal structures and compositions of the phases contained in the ceramic articles, as in Example 1.

Table 1 presents the evaluation results, in Example 3, of the three-point flexural strength, the relative density, the crystal grain size, and the percentage of the $Gd_4Al_2O_9$ phase present, along with the results of Example 1.

The dimensional accuracy of the ceramic articles of Example 3 was as good as 1% or less. As with the ceramic articles in Example 1, the shape of the shaped objects was unchanged before and after the steps (ii) and (iii), and maintained a similar shape.

The ceramic articles of Example 3 had the same phase-separated structure as in Example 1. That is, the results revealed five phases: a phase composed of $Al_2O_3$, a phase composed of $GdAlO_3$ (composite compound 1), a phase composed of $Gd_4Al_2O_9$ (composite compound 2), a phase composed of $Gd_2O_3$, and a phase composed mainly of zirconium oxide having a fluorite structure. The XRD results revealed that the $Gd_4Al_2O_9$ phase, which is considered to contribute significantly to the mechanical strength, was present in the ceramic articles in an amount of 4% by weight. The main metal elements contained in the phase composed mainly of zirconium oxide having the fluorite structure were Zr, Gd, and Tb.

In the ceramic articles obtained in this example, the phase composed mainly of zirconium oxide was not unevenly distributed. This presumably indicated that the zirconium oxide component diffused into the shaped object through the cracked portions and recrystallized as a phase-separated structure while incorporating rare-earth elements. The amount of Zr contained in each of the ceramic articles was examined. Among the metal elements contained in each ceramic article in this Example, the amount of Zr was 0.7% by mole.

Example 4

Shaped objects, each measuring 40 mm in width×4 mm in depth×3 mm in height, were manufactured for the three-point flexural strength test (step (i)) as in Example 1. Observation of the surfaces of these shaped objects with an optical microscope revealed that each of the shaped objects had a surface roughness Ra of 20 µm or less.

In the step (ii) of this Example, 15% by weight zirconium oxide-containing liquid 3 was prepared and used with the same dispersant and solvent as in Example 1. The step of allowing the shaped objects to absorb zirconium oxide-containing liquid 3 (step (ii)) and the step of heating the shaped objects that had absorbed zirconium oxide-containing liquid (step (iii)) were also performed under the same conditions as in Example 1.

In Example 4, the step (ii) and the step (iii) were alternately repeated three times each. In this way, five ceramic articles for strength test were obtained for Example 4.

The ceramic articles of Example 4 were analyzed for the three-point flexural strength, the relative density, the dimensional accuracy, and the crystal structures and compositions of the phases contained in the ceramic articles, as in Example 1.

Table 1 presents the evaluation results, in Example 4, of the three-point flexural strength, the relative density, the grain size, and the percentage of the phase of $Gd_4Al_2O_9$ (composite compound 2) present in the ceramic articles, along with the results of Example 1.

The dimensional accuracy of the ceramic articles of Example 4 was as good as 1% or less. As with the shaped objects in Example 1, the shape of the shaped objects was unchanged before and after the steps (ii) and (iii), and maintained a similar shape.

The ceramic articles of Example 4 had the same phase-separated structure as in Example 1. That is, the results revealed five phases: a phase composed of $Al_2O_3$, a phase composed of $GdAlO_3$ (composite compound 1), a phase composed of $Gd_4Al_2O_9$ (composite compound 2), a phase composed of $Gd_2O_3$, and a phase composed mainly of zirconium oxide having a fluorite structure. The XRD results revealed that the phase composed of $Gd_4Al_2O_9$ (composite compound 2), which is considered to contribute significantly to the mechanical strength, was present in the ceramic articles in an amount of 2% by weight. The main metal elements contained in the phase composed mainly of zirconium oxide having the fluorite structure were Zr, Gd, and Tb.

In the ceramic articles of Example 4, the phase composed mainly of zirconium oxide was not unevenly distributed. This presumably indicated that the zirconium oxide component diffused into the shaped object through the cracked portions and recrystallized as a phase-separated structure while incorporating rare-earth elements. The amount of Zr contained in each of the ceramic articles was examined. Among the metal elements contained in each ceramic article in this Example, the amount of Zr was 0.4% by mole.

Examples 5 and 6

Shaped objects, each measuring 40 mm in width x 4 mm in depth×3 mm in height, were manufactured for the three-point flexural strength test (step (i)) as in Example 1. Observation of the surfaces of these shaped objects with an optical microscope revealed that each of the shaped objects had a surface roughness Ra of 20 µm or less.

A mixture of an aqueous solution of zirconium hydroxide and $HNO_3$ was heated at 90° C. for 30 minutes and then filtered. The resulting solid was dried to give a precursor powder. The precursor powder was calcined at 1,000° C. to give a raw material zirconium oxide powder having an average particle size of 40 nm.

Similarly, the precursor powder was calcined at 1,030° C. to give a raw material zirconium oxide powder having an average particle size of 90 nm.

Using the raw material zirconium oxide powder, zirconium oxide-containing liquid 4 that contained the particles having an average particle size of 40 nm and zirconium oxide-containing liquid 5 that contained the particles having an average particle size of 90 nm were prepared in the same manner as in Example 1. Zirconium oxide-containing liquid 4 was prepared so as to have a zirconium oxide content of 30% by weight. Zirconium oxide-containing solution 5 was prepared so as to have a zirconium oxide content of 15% by weight.

In Example 5, zirconium oxide-containing liquid 4 was used as the metal component-containing liquid. The step of allowing the shaped objects to absorb zirconium oxide-containing liquid 4 (step (ii)) and the step of heating the shaped objects that had absorbed zirconium oxide-containing liquid 4 (step (iii)) were also performed under the same conditions as in Example 1. In Example 5, the step (ii) and the step (iii) were alternately repeated three times each.

In Example 6, zirconium oxide-containing liquid 5 was used as the metal component-containing liquid. The step of allowing the shaped objects to absorb zirconium oxide-containing liquid 5 (step (ii)) and the step of heating the shaped objects that had absorbed zirconium oxide-containing liquid 5 (step (iii)) were also performed under the same conditions as in Example 1. In Example 6, the step (ii) and the step (iii) were alternately repeated five times each.

In this way, five ceramic articles for strength tests were obtained for each of Examples 5 and 6.

The ceramic articles of each of Examples 5 and 6 were analyzed for the three-point flexural strength, the relative density, the dimensional accuracy, and the crystal structures and compositions of the phases contained in the shaped objects, as in Example 1. Table 1 presents the evaluation results along with the results of Example 1.

The dimensional accuracy of the ceramic articles of Examples 5 and 6 was as good as 1% or less. As with the shaped objects in Example 1, the shape of the shaped objects was unchanged before and after the steps (ii) and (iii), and maintained a similar shape.

The ceramic articles of Examples 5 and 6 had the same phase-separated structure as in Example 1. That is, each ceramic article contained five phases: a phase composed of $Al_2O_3$, a phase composed of $GdAlO_3$ (composite compound 1), a phase composed of $Gd_4Al_2O_9$ (composite compound 2), a phase composed of $Gd_2O_3$, and a phase composed mainly of zirconium oxide having a fluorite structure. The main metal elements contained in the phase composed mainly of zirconium oxide having the fluorite structure were Zr, Gd, and Tb.

The phase composed mainly of zirconium oxide was not unevenly distributed. The zirconium oxide component diffused into the shaped object through the cracked portions and recrystallized as a phase-separated structure while incorporating rare-earth elements. The amount of Zr contained in each ceramic article of each of Examples 5 and 6 was examined. The amount of Zr was 1.1% by mole for Example 5. The amount of Zr was 0.5% by mole for Example 6.

Examples 7 and 8

A $SiO_2$ powder having an average particle size of about 38 μm and a $Tb_4O_7$ powder having an average particle size of 4 μm were provided. The powders were weighed in such a manner that Si was 96.5% by mole on an oxide basis and Tb was 3.5% by mole on an oxide basis. These weighed powders were mixed with a dry ball mill for 30 minutes to obtain a mixed powder (raw material powder). The composition analysis of the raw material powder by ICP atomic emission spectroscopy revealed that the aluminum oxide content was less than 1% by mole.

Rectangular parallelepipeds, each measuring 5 mm×42 mm×6 mm, were manufactured as shaped objects of Examples 7 and 8 in the same way as in Example 1, except for a laser beam power of 47.5 W, a drawing speed of 60 mm/s, and a drawing pitch of 80 μm. Observation of the surfaces of these shaped objects with an optical microscope revealed that the shaped objects were porous and a portion of each shaped object excluding pores had a surface roughness Ra of 20 μm or less.

Each of the resulting shaped objects was separated from the alumina base and polished to provide a shaped object, measuring 40 mm in width×4 mm in depth×3 mm in height, for a three-point flexural strength test.

An aluminum oxide-containing liquid was used as a metal component-containing liquid. Silicon oxide, which was a main component of the shaped objects, and aluminum oxide are in a eutectic relationship. Fine alumina particles having an average particle size of 25 nm (available from Kanto Chemical Co., Inc.), 2-hydroxyethyl acrylate and 3-acryloxypropyltrimethoxysilane as dispersants, and methyl ethyl ketone as a solvent were mixed together in such a manner that the resulting dispersion had an alumina content of 70% by weight. The dispersion was uniformly stirred to prepare aluminum oxide-containing liquid 1.

The above-mentioned shaped objects processed for the test were allowed to absorb aluminum oxide-containing liquid 1, degassed under reduced pressure for 1 minute to allow the liquid to be absorbed into the inside of the shaped objects, and then dried naturally for 1 hour (step (ii)).

Then, the shaped objects that had absorbed aluminum oxide-containing liquid 1 were placed in an electric furnace and heated. In an air atmosphere, the temperature was increased to 1,610° C., which is higher than or equal to the eutectic point of silicon oxide and aluminum oxide and lower than or equal to the melting point of silicon oxide, over a period of 2.5 hours and held at 1,610° C. for 50 minutes. After that, the energization was terminated, and the shaped objects were naturally cooled to 200° C. or lower over a period of 5.0 hours (step (iii)).

In Example 7, the step of allowing the shaped objects to absorb aluminum oxide-containing liquid 1 (step (ii)) and the step of performing heat treatment (step (iii)) were alternately repeated twice each to manufacture five ceramic articles.

In Example 8, alumina particles (available from Kanto Chemical Co., Inc.) having an average particle size of 25 nm were calcined at 1,100° C. and then pulverized to provide aluminum oxide particles having an average particle size of 90 nm. The resulting aluminum oxide particles were used as a raw material for aluminum oxide-containing liquid 2. Five ceramic articles of Example 8 were manufactured in the same way as in Example 7, except that the aluminum oxide particles were changed.

The ceramic articles of each of Examples 7 and 8 were analyzed for the three-point flexural strength, the relative density, the dimensional accuracy, and the crystal structures and compositions of the phases contained in the shaped objects, as in Example 1. Table 1 presents the evaluation results of Examples 7 and 8.

The dimensional accuracy of the ceramic articles of Examples 7 and 8 was as good as 1% or less. As with the shaped objects of other Examples, the shape of the shaped objects was almost unchanged before and after the steps (ii) and (iii), and maintained a similar shape.

Each of the ceramic articles of Examples 7 and 8 had a phase-separated structure containing a $SiO_2$ (cristobalite) phase, a $Si_2Tb_2O_7$ phase, and a phase composed of $Al_2O_3$. A non-stoichiometric composite oxide composed of $Al_2O_3$—$SiO_2$ was also present. The $Si_2Tb_2O_7$ phase and the non-stoichiometric composite oxide composed of $Al_2O_3$—$SiO_2$ correspond to two composite oxide phases. The $Al_2O_3$ phase corresponds to the phase derived from the inorganic particles of a metal component-containing liquid.

The phase composed of aluminum oxide was not unevenly distributed. The aluminum oxide component diffused into the shaped object through the cracked portions and recrystallized as a phase-separated structure. The amount of Al contained in each ceramic article of each of Examples 7 and 8 was examined. The amount of Al was 0.8% by mole for Example 7. The amount of Al was 0.4% by mole for Example 8.

Comparative Example 1

Five shaped objects each measuring 40 mm in width x 4 mm in depth×3 mm in height were manufactured as in Example 1. Observation of the surfaces of these shaped objects with an optical microscope revealed that each of the shaped objects had a surface roughness Ra of 20 μm or less.

Articles were manufactured in the same manner as in Example 1, except that the step of allowing the resulting shaped objects to absorb the metal component-containing liquid (step (ii)) and the step of heating the shaped object impregnated with the metal component-containing liquid (step (iii)) were not performed.

For the shaped objects of Comparative example 1, the three-point flexural strength, the relative density, and the crystal structures and compositions of the phases contained in the shaped objects were evaluated as in Example 1. Table 1 presents the evaluation results of the three-point flexural strength and the relative density. In Comparative example 1, since the heating step (step (iii)) was not performed, some amorphous regions were present. Thus, the grain size was evaluated only in a crystalline portion.

Each of the shaped objects of Comparative example 1 consisted of a phase composed mainly of $Al_2O_3$, a phase composed of $GdAlO_3$, a $Gd_2O_3$ phase, which was a residual raw material, and an amorphous phase whose composition was not fixed. Each shaped object of Comparative example 1 had cracks extending in accordance with the drawing directions of the laser beam. In other words, there were cracks extending in directions inclined at about 45° to each side of the rectangle. The cracks had a width of several nanometers to several micrometers.

Comparative Example 2

Five shaped objects each measuring 40 mm in width x 4 mm in depth×3 mm in height were manufactured as in Example 1. Observation of the surfaces of these shaped objects with an optical microscope revealed that each of the shaped objects had a surface roughness Ra of 20 μm or less.

Articles, each measuring 40 mm in width×4 mm in depth×3 mm in height, for the three-point flexural strength test were manufactured as in Example 1, except that the step of allowing the resulting shaped objects to absorb a metal component-containing liquid containing inorganic oxide (step (ii)) was omitted, and only the step (iii) was performed. In other words, after shaping, the shaped objects were placed in an electric furnace and subjected to heat treatment only. Five ceramic articles were manufactured by repeating the following process three times: in an air atmosphere, the temperature was increased to 1,670° C. over a period of 2.5 hours and held at 1,670° C. for 50 minutes, and then the energization was terminated to allow the articles to cool naturally.

The ceramic articles of Comparative example 2 were analyzed for the three-point flexural strength, the relative density, and the crystal structures and compositions of the phases contained in the ceramic articles, as in Example 1.

Table 1 presents the measurement results of the three-point flexural strength and the relative density. The results of the analysis revealed that the ceramic articles of Comparative example 2 consisted of two phases: a phase composed of $Al_2O_3$ and a phase composed of $GdAlO_3$. In each comparative ceramic article of Comparative example 2, cracks extending in accordance with the drawing directions of the laser beam were left. In other words, there were cracks extending in directions inclined at about 45° to each side of the rectangle. The cracks had a width of several nanometers to several micrometers.

Comparative Examples 3 and 4

An $\alpha$-$Al_2O_3$ powder having an average particle size of about 20 μm was provided. The composition analysis of the raw material powder by ICP atomic emission spectroscopy revealed that the zirconium oxide content was less than 1% by mole. Five shaped objects of each of Comparative examples 3 and 4 were manufactured through the same process as illustrated in FIGS. 1A to 1H above.

Comparative shaped objects each measuring 50 mm in width×10 mm in depth×8 mm in height were manufactured under the same conditions as in Example 1, except for a laser power of 50 W, a laser irradiation speed of 50 mm/s, and a laser drawing pitch of 50 μm. The surface roughness of the comparative shaped objects was large enough to be visually observed, and thus Ra was not measurable.

The shape of each shaped object was adjusted by polishing so as to have a size of 40 mm in width×4 mm in depth x 3 mm in height. Optical microscope observation of the surfaces of the shaped objects after the polishing revealed that cracks were formed in accordance with the drawing directions of the laser beam. In other words, there were cracks extending in directions inclined at about 45° to each side of the rectangle.

$Fe_2O_3$ particles having an average particle size of 25 nm (available from Kanto Chemical Co., Inc.) and 2-hydroxyethyl acrylate and 3-acryloxypropyltrimethoxysilane, serving as dispersants, were mixed together. The mixture was uniformly stirred. Propylene glycol monomethyl ether acetate, serving as a solvent, was added thereto in such a manner that the resulting dispersion had an iron oxide content of 70% by weight. The resulting mixture was uniformly stirred to prepare an iron oxide-containing liquid.

Aluminum oxide, which is a component of the shaped objects of this comparative example, does not form a eutectic with iron oxide in the dispersion.

In Comparative example 3, the maximum temperature of the heat treatment was set to 1,800° C., which is higher than 1,700° C. at which a phase change occurs, with reference to the phase diagram of an $Al_2O_3$—$Fe_2O_3$ system. Other conditions were the same as in Example 1, and five ceramic articles were obtained by allowing the shaped objects to absorb the iron oxide-containing liquid and then performing heat treatment.

In Comparative example 4, five ceramic articles were manufactured as in Comparative example 3, except that the maximum temperature of the heat treatment was set to 1,650° C., which is lower than the 1,700° C. at which the phase change of the $Al_2O_3$—$Fe_2O_3$ system occurs.

The ceramic articles of Comparative examples 3 and 4 were analyzed for the three-point flexural strength, the dimensional accuracy, the relative density, and the crystal structures and compositions of the phases contained in the ceramic articles, as in Example 1. Table 1 presents the evaluation results.

The dimensional accuracy of each of the ceramic articles of Comparative examples 3 and 4 was 1% or less.

When the cross sections of the ceramic articles of Comparative examples 3 and 4 near the center were polished and observed by SEM, cracks extending in accordance with the drawing directions were left in all ceramic articles. The ceramic articles of Comparative example 3 were composed of $(Al,Fe)_2O_3$ having a corundum structure. A large amount of Fe was detected near the cracks. No phase-separated structure was observed. The ceramic articles of Comparative example 4 were mostly composed of $Al_2O_3$ having a corundum structure. $AlFe_2O_4$ having a spinel structure was partially formed near the cracks.

Comparative Example 5

Shaped objects, each measuring 40 mm in width x 4 mm in depth×3 mm in height, were manufactured for the three-point flexural strength test as in Example 7, except that the step of allowing the shaped objects to absorb a metal component-containing liquid (step (ii)) was not performed. In other words, only the step of allowing the shaped object to absorb the metal component-containing liquid (step (ii)) was omitted, whereas the shaped objects were placed in an electric furnace and subjected to the heat treatment (step (iii)). Five ceramic articles were manufactured by repeating the following process twice: in an air atmosphere, the temperature was increased to 1,610° C. over a period of 2.5 hours and held at 1,610° C. for 50 minutes, and then the energization was terminated to allow the articles to cool naturally.

The ceramic articles of Comparative example 5 were analyzed for the three-point flexural strength, the relative density, and the crystal structures and compositions of the phases contained in the comparative ceramic articles, as in Example 7. Table 1 presents the measurement results.

The results of the analysis revealed that the ceramic articles of Comparative example 5 were composed of two phases: a $SiO_2$ (cristobalite) phase and a $Si_2Tb_2O_7$ phase. In each ceramic article of Comparative example 5, there were cracks that extended in accordance with the drawing directions of the laser beam and that extended in directions inclined at about 45° to each side of the rectangle. The cracks had a width of several nanometers to several micrometers.

TABLE 1

|  | Relative density [%] | Three-point flexural strength [MPa] | Particle size [μm] | Composite compound 1 | Composite compound 2 | Percentage of composite compound 2 present [% by weight] |
|---|---|---|---|---|---|---|
| Example 1 | 95.9 | 173 | 4.5 | $GdAlO_3$ | $Gd_4Al_2O_9$ | 4 |
| Example 2 | 96.0 | 175 | 4.0 | $GdAlO_3$ | $Gd_4Al_2O_9$ | 4 |
| Example 3 | 95.8 | 165 | 5.0 | $GdAlO_3$ | $Gd_4Al_2O_9$ | 4 |
| Example 4 | 95.2 | 128 | 9.6 | $GdAlO_3$ | $Gd_4Al_2O_9$ | 2 |
| Example 5 | 95.4 | 135 | 8.9 | $GdAlO_3$ | $Gd_4Al_2O_9$ | 2 |
| Example 6 | 95.2 | 116 | 16.0 | $GdAlO_3$ | $Gd_4Al_2O_9$ | 1 |
| Example 7 | 82.2 | 24 | 11.0 | $Tb_2Si_2O7$ | — | — |
| Example 8 | 80.3 | 18 | 12.2 | $Tb_2Si_2O7$ | — | — |
| Comparative example 1 | 94.1 | 19 | 2.2 (crystalline portion) | $GdAlO_3$ | — | — |
| Comparative example 2 | 94.5 | 31 | 18.3 | $GdAlO_3$ | — | — |
| Comparative example 3 | 94.8 | 27 | 3.9 | $AlFe_2O_4$ | — | — |
| Comparative example 4 | 94.7 | 25 | 3.7 | $AlFe_2O_4$ | — | — |
| Comparative example 5 | 78.9 | 7 | 10.4 | $Tb_2Si_2O_7$ | — | — |

Discussion

From the results presented in Table 1, the following was found.

The ceramic articles of Examples 1 to 6, manufactured using the metal component-containing liquids of the present invention and composed mainly of aluminum oxide, exhibited greatly improved three-point flexural strength, compared with the ceramic articles of Comparative examples 1 to 4, in which the metal component-containing liquids of the present invention were not used. This indicated that the use of the metal component-containing liquid of the present invention enabled a significant improvement in the mechanical strength of the shaped object.

In Comparative examples 3 and 4, in which the shaped objects were manufactured using the metal component-containing liquid that contained particles mainly composed of iron oxide, which did not form a eutectic with aluminum oxide, the cracks remained almost as they were when the objects were formed. Unlike Examples 1 to 6, high mechanical strength was not obtained. In Comparative Examples 3 and 4, it is thought that the Fe component in the iron oxide particles only diffused into the shaped objects, and no melting of the cracked portions occurred.

In contrast, in Examples 1 to 6, where the metal component-containing liquids that contains zirconium oxide were used, the liquids being capable of forming a eutectic with aluminum oxide contained in the shaped objects, it is thought that melting occurred only in the vicinities of the cracks, and the cracks were reduced or eliminated while maintaining the shape and dimensions of the shaped objects. In addition, the ceramic articles containing aluminum oxide as the main component had a high mechanical strength (three-point flexural strength) of 100 MPa or more presumably because phases into which zirconium oxide particle components were incorporated were recrystallized.

In Examples 1 to 5, where the accumulated holding time of the heat treatment was as short as 30 minutes or less, the grain size of the crystalline grains contained in the ceramic articles was as small as 10 μm or less, and higher mechanical strength was obtained than that in Example 6, where the accumulated holding time of the heat treatment was as long as 50 minutes.

In Examples 1 to 6, a larger percentage of the composite compound $Gd_4Al_2O_9$ phase tended to provide superior mechanical strength.

The ceramic articles composed mainly of silicon oxide according to Examples 7 and 8 were porous and had a relative density of 82.2% for Example 7 and 80.3% for Example 8. This is presumably because the porous state was caused by the high viscosity of the silicon oxide component when melted by laser irradiation. Despite the fact that the resulting shaped objects were porous, a mechanical strength of about 20 MPa was obtained by using the metal component-containing liquids of the present invention. In contrast, in Comparative example 5, in which the dispersion of the present invention was not used, the three-point flexural strength was as low as 7 MPa.

A comparison between Examples 7 and 8 indicated that in Example 7, where the dispersion having a smaller particle size was used, higher mechanical strength was obtained than in Example 8, where the dispersion having a larger particle size was used. This is presumably because the small particles penetrated deep into the cracks and acted on them.

From the comparison of Examples 1 to 4, it can be seen that when the inorganic oxide particle content of the dispersion is large, high mechanical strength can be obtained even in the case of a small number of times of the implementation of the steps (ii) and (iii).

A comparison of Examples 3 and 4 indicates that increasing the number of repetitions of the steps (ii) and (iii) improves the three-point flexural strength of the shaped objects. This is presumably because the percentage of repaired cracks was increased.

In all Examples and Comparative examples 1 and 2, the shaped objects had a surface roughness Ra of 20 μm or less, in other words, high modeling accuracy was obtained. In contrast, in Comparative examples 3 and 4, visually recognizable irregularities (estimated to be 100 to 300 μm) were observed on the surfaces and sides of the shaped objects. This is because the ceramic powder serving as the raw material powder used in each Example did not contain a component with high energy absorption for laser beam irradiation, specifically the $Tb_2O_{3.5}$ powder ($Tb_4O_7$ powder).

As described above, the metal component-containing liquid of the present invention can be used in additive manufacturing to improve the mechanical strength of the shaped object while achieving high shape accuracy, making it possible to obtain a ceramic article having high mechanical strength despite its complex or fine shape.

According to the present invention, it is possible to provide a metal component-containing liquid that can further improve the mechanical strength of a shaped object while maintaining the feature of the direct shaping process, which can produce a shaped object having a fine and complex shape. In addition, it is possible to provide a method for manufacturing a ceramic article using the metal component-containing liquid. Moreover, a ceramic article according to the present invention can be easily manufactured by using a ceramic article-manufacturing kit containing a powder that contains a ceramic material as a main component and the above-described metal component-containing liquid that contains water and metal ions.

According to the present invention, it is possible to manufacture a ceramic article with high accuracy and superior mechanical strength by an additive manufacturing method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A ceramic article manufactured by an additive manufacturing technology, comprising three types of phases containing at least one type of metal element in common; and
   a phase different from the three types of phases,
   wherein at least two of the three types of phases are phases of composite compounds,
   wherein the phase different from the three types of phases and at least one of the three types of phases are in a relationship in which a eutectic is formable, and
   wherein the ceramic article contains 0.3% or more by mole and 5% or less by mole of a metal element contained most in the phase different from the three types of phases.

2. The ceramic article according to claim 1, wherein the composite compounds are composite oxides.

3. The ceramic article according to claim 2, the phase different from the three types of phases is a phase composed mainly of zirconium oxide.

4. The ceramic article according to claim 2, comprising other phase other than the three types of phases and the phase different from the three types of phases, the other phase being composed of oxide.

5. The ceramic article according to claim 1, wherein the metal element commonly contained in the three types of phases is aluminum.

6. The ceramic article according to claim 5, wherein the metal element contained most in the phase different from the three types of phases is zirconium.

7. The ceramic article according to claim 1, wherein the three types of phases include a phase of a compound containing a single type of metal element.

8. The ceramic article according to claim 7, wherein at least one of the composite compounds and the phase of the compound containing the single type of metal element are in a relationship in which a eutectic is formable.

9. The ceramic article according to claim 7, wherein the phase of the compound containing the single type of metal element is aluminum oxide.

10. The ceramic article according to claim 1, wherein the composite compounds contain a rare-earth element.

11. The ceramic article according to claim 10, wherein the rare-earth element is at least one selected from the group consisting of gadolinium, yttrium, terbium, and praseodymium.

12. The ceramic article according to claim 10, wherein the composite compounds are composite oxides.

13. The ceramic article according to claim 12, the phase different from the three types of phases is a phase composed mainly of zirconium oxide.

14. The ceramic article according to claim 10, wherein the metal element commonly contained in the three types of phases is aluminum.

15. The ceramic article according to claim 14, wherein the metal element contained most in the phase different from the three types of phases is zirconium.

16. A ceramic article manufactured by an additive manufacturing technology, comprising three types of phases containing at least one type of metal element in common,
wherein two of the three types of phases are phases of composite compounds, and
wherein the two composite compounds are $GdAlO_3$ and $Gd_4Al_2O_9$.

17. The ceramic article according to claim 16, further comprising a phase different from the three types of phases, wherein the phase different from the three types of phases and at least one of the three types of phases are in a relationship in which a eutectic is formable.

18. The ceramic article according to claim 17, wherein the phase different from the three types of phases and the phases of the composite compounds are in a relationship in which a eutectic is formable.

19. The ceramic article according to claim 17, wherein the ceramic article contains 0.3% or more by mole and 5% or less by mole of a metal element contained most in the phase different from the three types of phases.

20. A ceramic article manufactured by an additive manufacturing technology, comprising three types of phases containing at least one type of metal element in common,
wherein two of the three types of phases are phases of composite compounds, and
wherein the three types of phases are phases of $Al_2O_3$, $GdAlO_3$, and $Gd_4Al_2O_9$.

* * * * *